(12) United States Patent
Yokota et al.

(10) Patent No.: US 12,195,098 B2
(45) Date of Patent: Jan. 14, 2025

(54) OPENING/CLOSING MECHANISM FOR OPENING/CLOSING MEMBER

(71) Applicant: MITSUI KINZOKU ACT CORPORATION, Yokohama (JP)

(72) Inventors: Yoshiaki Yokota, Yokohama (JP); Kohei Yamashita, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 297 days.

(21) Appl. No.: 17/911,024

(22) PCT Filed: Jul. 29, 2020

(86) PCT No.: PCT/JP2020/029045
§ 371 (c)(1),
(2) Date: Sep. 12, 2022

(87) PCT Pub. No.: WO2022/024258
PCT Pub. Date: Feb. 3, 2022

(65) Prior Publication Data
US 2023/0098726 A1    Mar. 30, 2023

(51) Int. Cl.
*B62D 33/03*    (2006.01)
*B62D 33/037*   (2006.01)
*E05F 15/614*   (2015.01)

(52) U.S. Cl.
CPC .......... *B62D 33/037* (2013.01); *B62D 33/03* (2013.01); *E05F 15/614* (2015.01)

(58) Field of Classification Search
CPC .......................... B62D 33/03; E05Y 2900/544
USPC ...................................................... 296/57.1
See application file for complete search history.

(56) References Cited

U.S. PATENT DOCUMENTS

| 9,540,859 B2 | 1/2017 | Hansen |
| 2009/0186736 A1 | 7/2009 | Ta et al. |
| 2015/0315837 A1 | 11/2015 | Salmon et al. |
| 2018/0229779 A1 | 8/2018 | Jergess et al. |

FOREIGN PATENT DOCUMENTS

| JP | 2009-165838 A | 7/2009 |
| JP | 2015-536277 A | 12/2015 |

*Primary Examiner* — Dennis H Pedder
(74) *Attorney, Agent, or Firm* — Foley & Lardner LLP

(57) ABSTRACT

An opening/closing mechanism for a tail gate includes a hinge device configured to rotate the tail gate relative to side walls, and a latch device configured for engagement with a striker provided on the side wall to hold the tail gate in a closed state. The hinge device includes an electric driving device provided on the tail gate and configured to rotate the tail gate by means of a motor, and a coupling configured to couple a body-side engagement portion provided on the side wall and an output shaft of the electric driving device together. The output shaft of the electric driving device fits in a fitting hole portion in a first cylindrical portion formed at one end side of the coupling, and the body-side engagement portion fits in a fitting recessed portion in a second cylindrical portion formed at the other end side of the coupling.

5 Claims, 20 Drawing Sheets

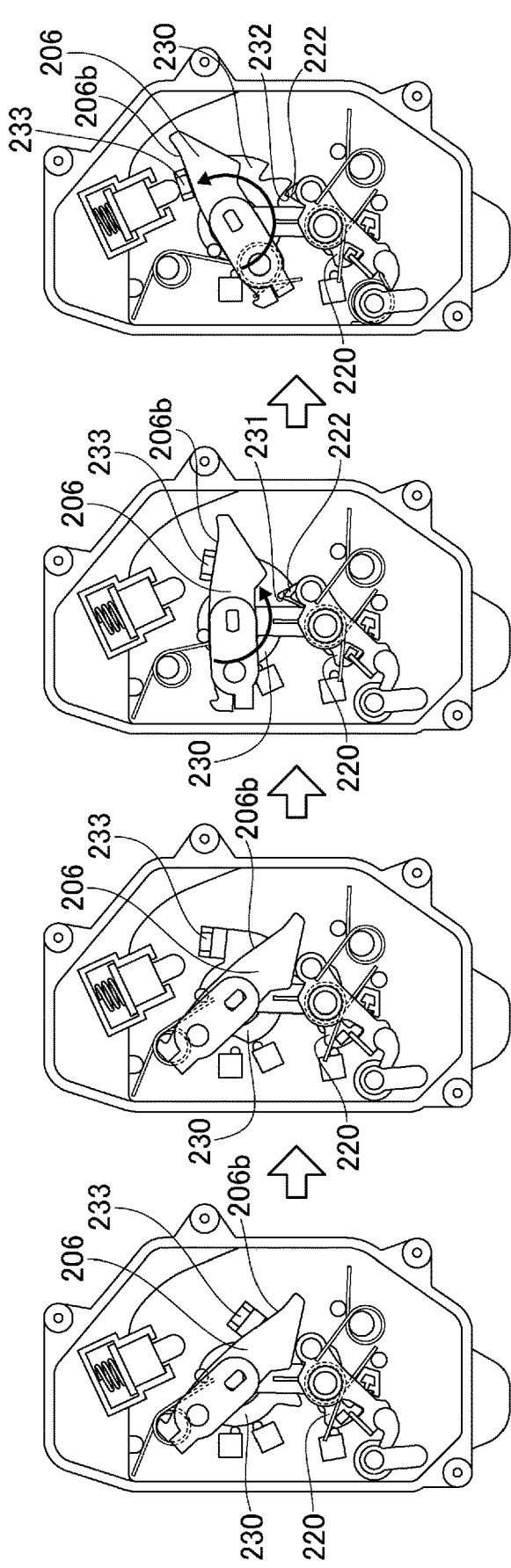

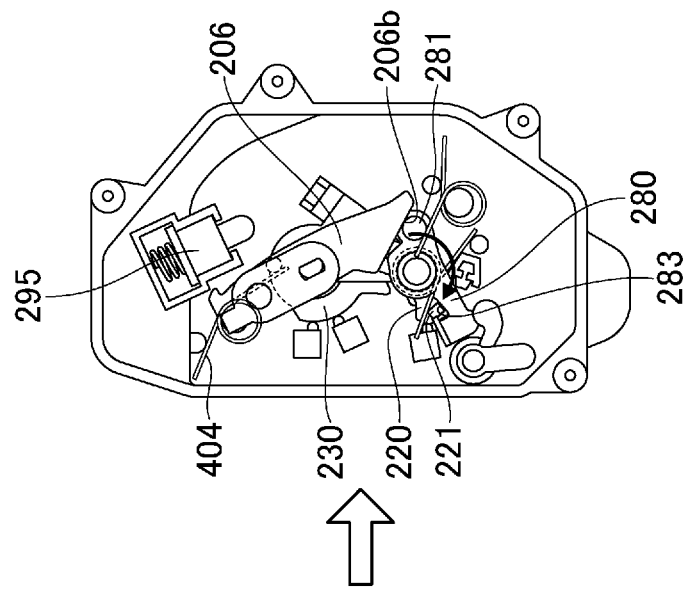
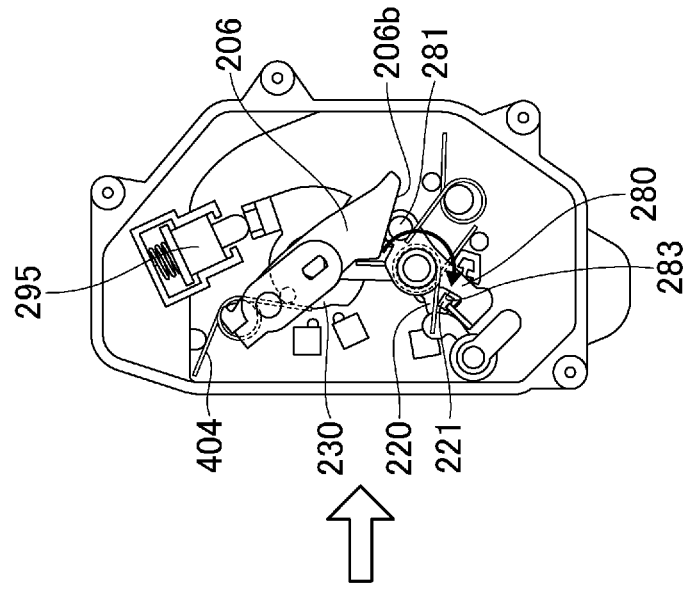
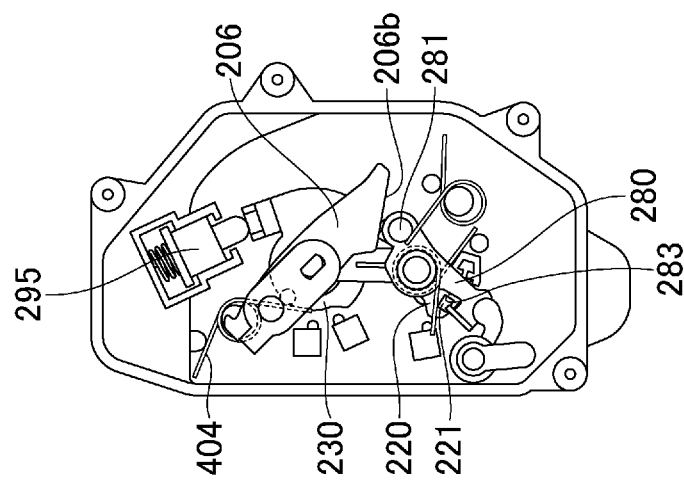

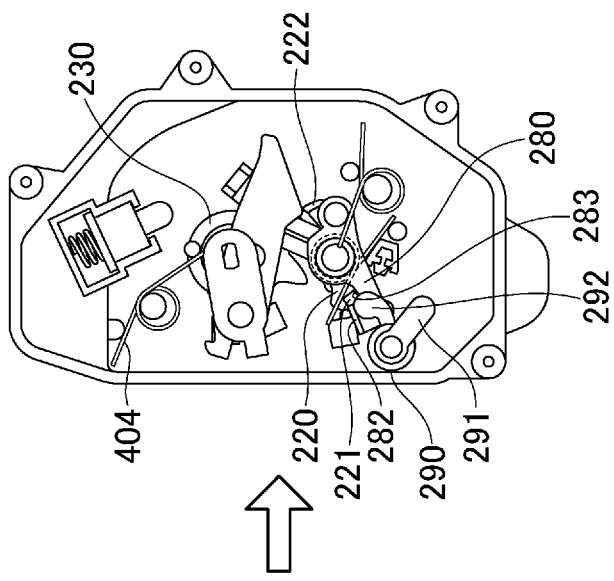
Fig. 12(a)
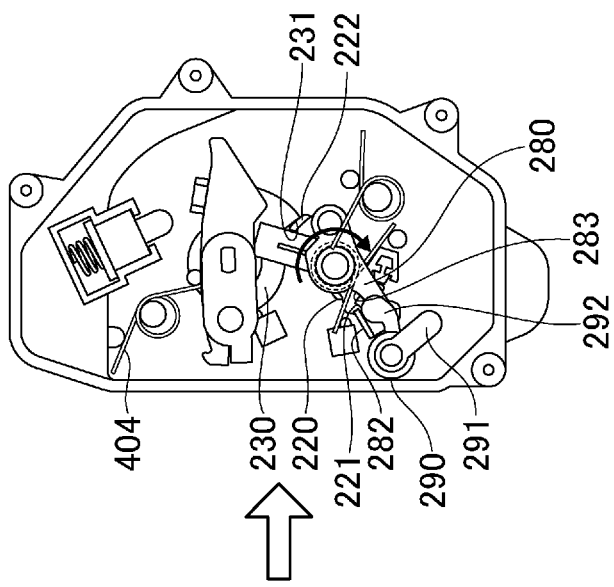
Fig. 12(b) [OVERRIDE OPERATION]
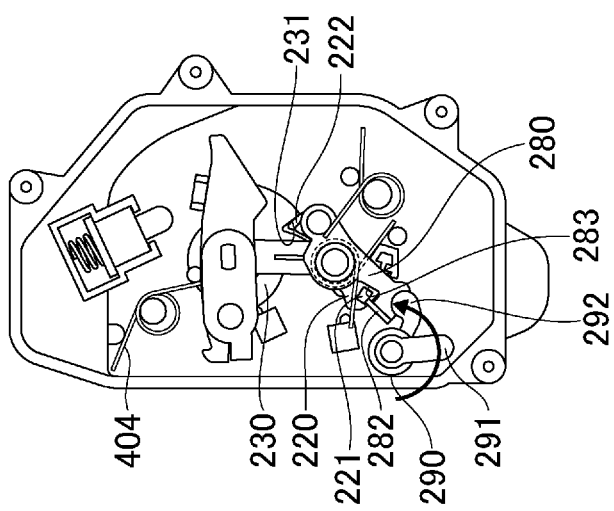
Fig. 12(c)

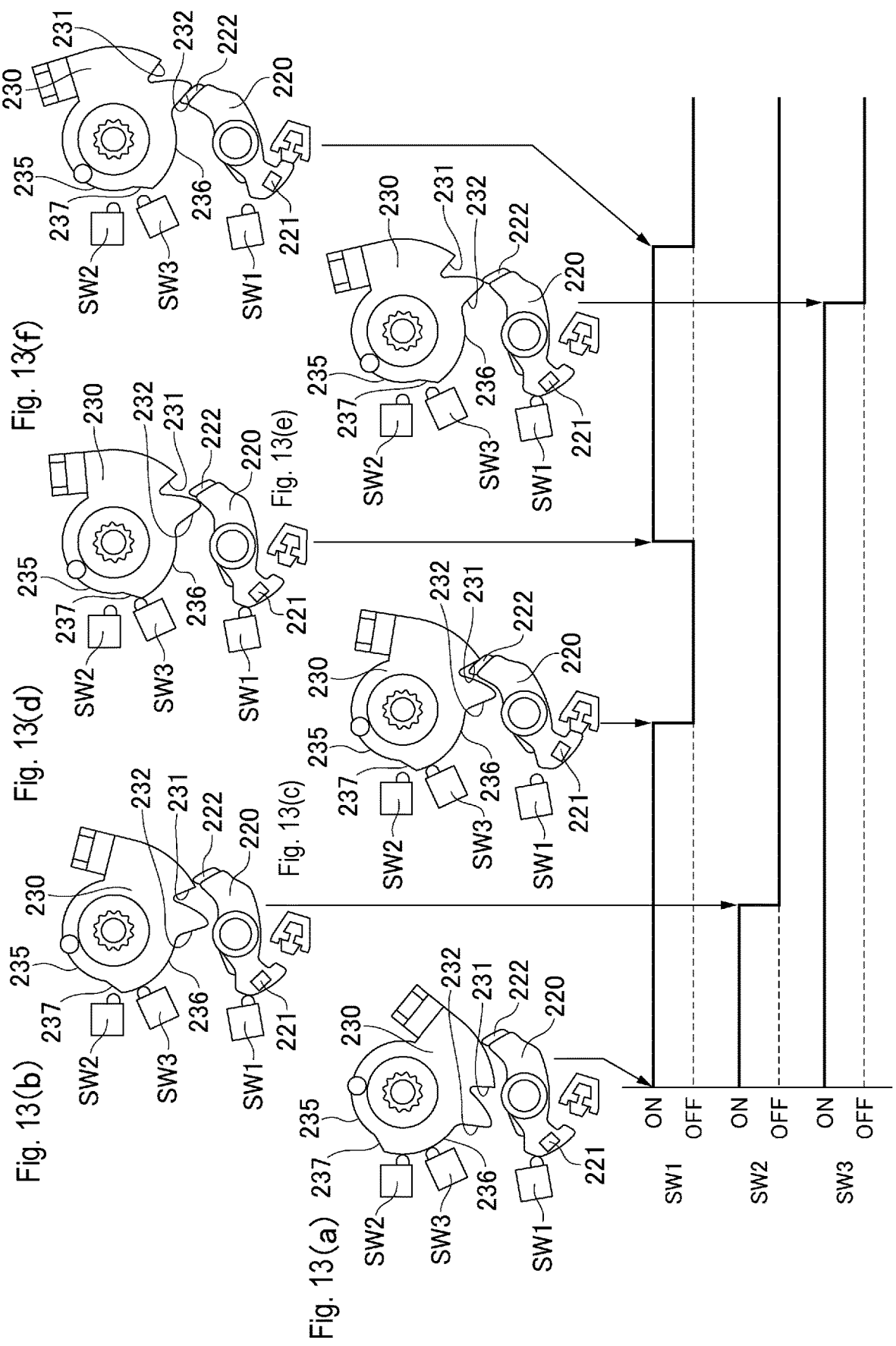

OPENING/CLOSING MECHANISM FOR OPENING/CLOSING MEMBER

CROSS-REFERENCE TO RELATED APPLICATIONS

The present application claims priority under 37 U.S.C. § 371 to International Patent Application No. PCT/JP2020/029045, filed Jul. 29, 2020. The content of this application is hereby incorporated by reference in its entirety.

TECHNICAL FIELD

The present invention relates to an opening/closing mechanism for an opening/closing member which includes a hinge device and a latch device.

BACKGROUND ART

For example, a tail gate of a pick-up truck is known as an opening/closing member of a vehicle. In recent years, a tail gate becomes larger in size in association with an increase in size of a pick-up truck, and there have been developed technologies for opening and closing a tail gate using a motor (for example, refer to Patent Literature 1).

CITATION LIST

Patent Literature

Patent Literature 1: Description of U.S. Pat. No. 9,540,859

SUMMARY OF INVENTION

Technical Problem

In an opening/closing mechanism for an opening/closing member like an opening/closing mechanism for such a tail gate, since a motor, a motor control device, and the like are installed therein, the tail gate is enlarged further in size. In a tail gate opening/closing mechanism described in Patent Literature 1, since a driving force of a motor of a hinge device is transmitted to a body side via a torque bar that is fitted in a coupling, the hinge device gets larger in size, as a result of which there still remains a room for improvement. The present invention provides an opening/closing mechanism for an opening/closing member which can suppress the enlargement in size of a hinge device.

Solution to Problem

According to the present invention, an opening/closing mechanism for an opening/closing member, includes: a hinge device configured to rotate the opening/closing member relative to a vehicle body; and a latch device configured to be brought into engagement with a striker provided on the vehicle body to hold the opening/closing member in a closed state, wherein the hinge device comprises: an electric driving device provided on the opening/closing member and configured to rotate the opening/closing member by means of a driving force of a motor; and a coupling configured to couple a body-side engagement portion provided on the vehicle body and an output shaft of the electric driving device together, and wherein the coupling comprises: a first cylindrical portion provided at one end side and having a fitting hole portion, to which the output shaft of the electric driving device is spline fit; a second cylindrical portion provided at the other end side and having a fitting recessed portion configured to fit on the body-side engagement portion; and a coupling portion where the first cylindrical portion and the second cylindrical portion are coupled together.

Advantageous Effects of Invention

According to the present invention, since the output shaft of the electric driving device is directly fitted in the coupling, the hinge device can be prevented from being enlarged in size.

BRIEF DESCRIPTION OF DRAWINGS

FIGS. 10 (a)-10 (d) show explanatory diagrams explaining a cinching operation of the latch device, in which FIG. 10 (a) shows that the latch device stays in an unlatching position, FIG. 10 (b) shows that the latch device stays in a half-latching position, FIG. 10 (c) shows that the latch device stays in a cinching operation starting position, and FIG. 10 (d) shows that the latch device stays in a full-latching position.

FIGS. 11 (a)-11 (c) show explanatory diagrams explaining a release operation of the latch device, in which FIG. 11 (a) shows that the latch device stays in a full-latching position, FIG. 11 (b) shows the latch device stays in a release operation starting position, and FIG. 11 (c) shows that the latch device stays in an unlatching position.

FIGS. 12 (a)-12 (c) show explanatory diagrams explaining an override operation of the latch device, in which FIG. 12 (a) shows that the latch device stays in an override operation starting position, FIG. 12 (b) shows that the latch device stays in a state in which an override operation is being performed, and FIG. 12 (c) shows that the latch device stays in unlatching position.

FIGS. 13 (a)-13 (f) are explanatory diagrams showing a relationship between states of three switches and positions of a pawl and a ratchet.

FIG. 19 is an exploded perspective view of the electric driving device shown in

FIG. 18.

DESCRIPTION OF EMBODIMENTS

Figure 1:
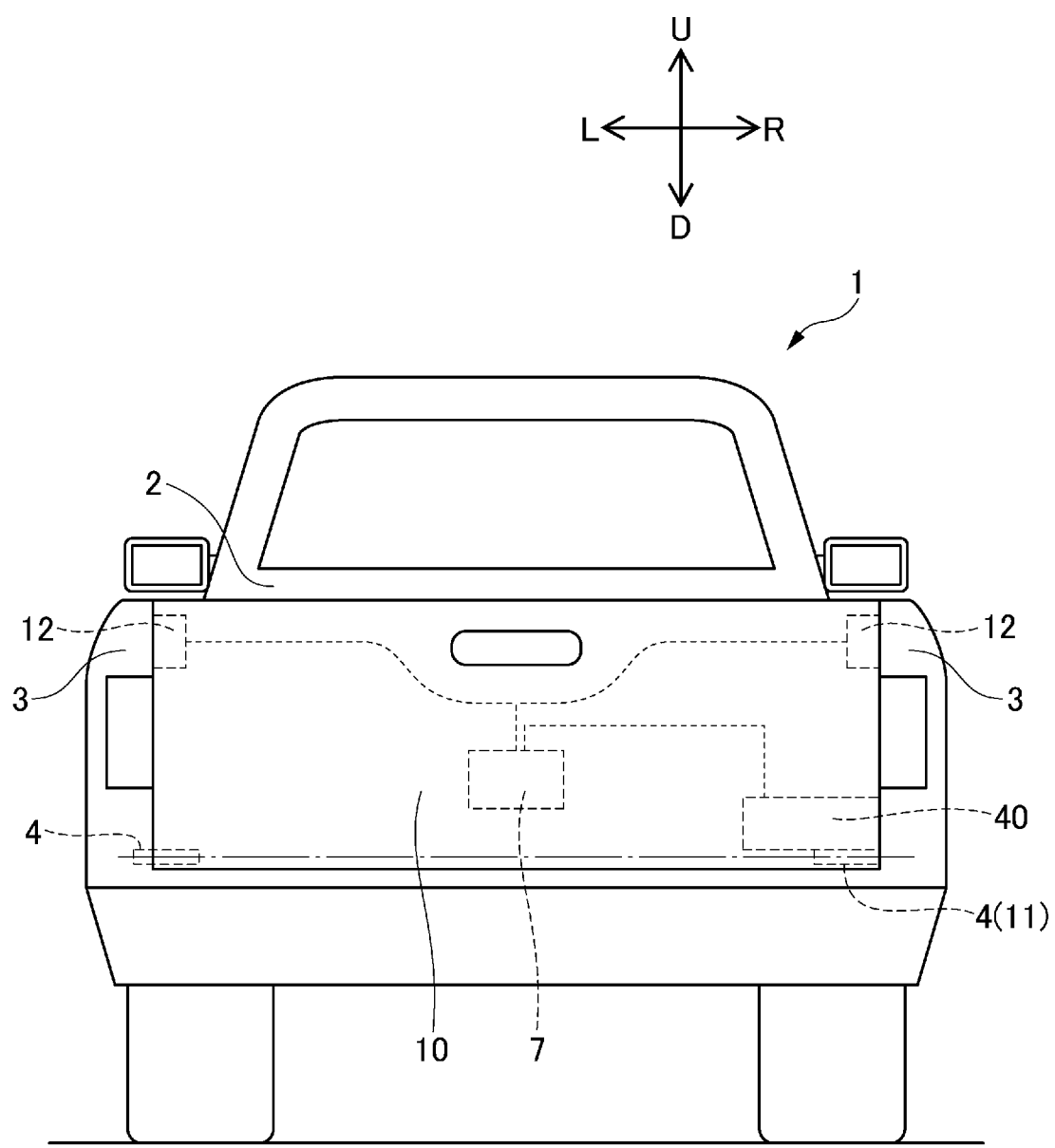
FIG. 1 is a rear view of a pick-up truck that installs an opening/closing mechanism for an opening/closing member according to an embodiment of the present invention.

Hereinafter, a pick-up truck tail gate opening/closing mechanism, which configures an embodiment of an opening/closing mechanism for an opening/closing member of the present invention, will be described in detail based on drawings. In the drawings, Fr denotes the front of a pick-up truck, Rr denotes the rear of the pick-up truck, L denotes a left-hand side of the pick-up truck, R denotes a right-hand side of the pick-up truck, U denotes an up side of the pick-up truck, and D denotes a down side of the pick-up truck.

Figure 2:
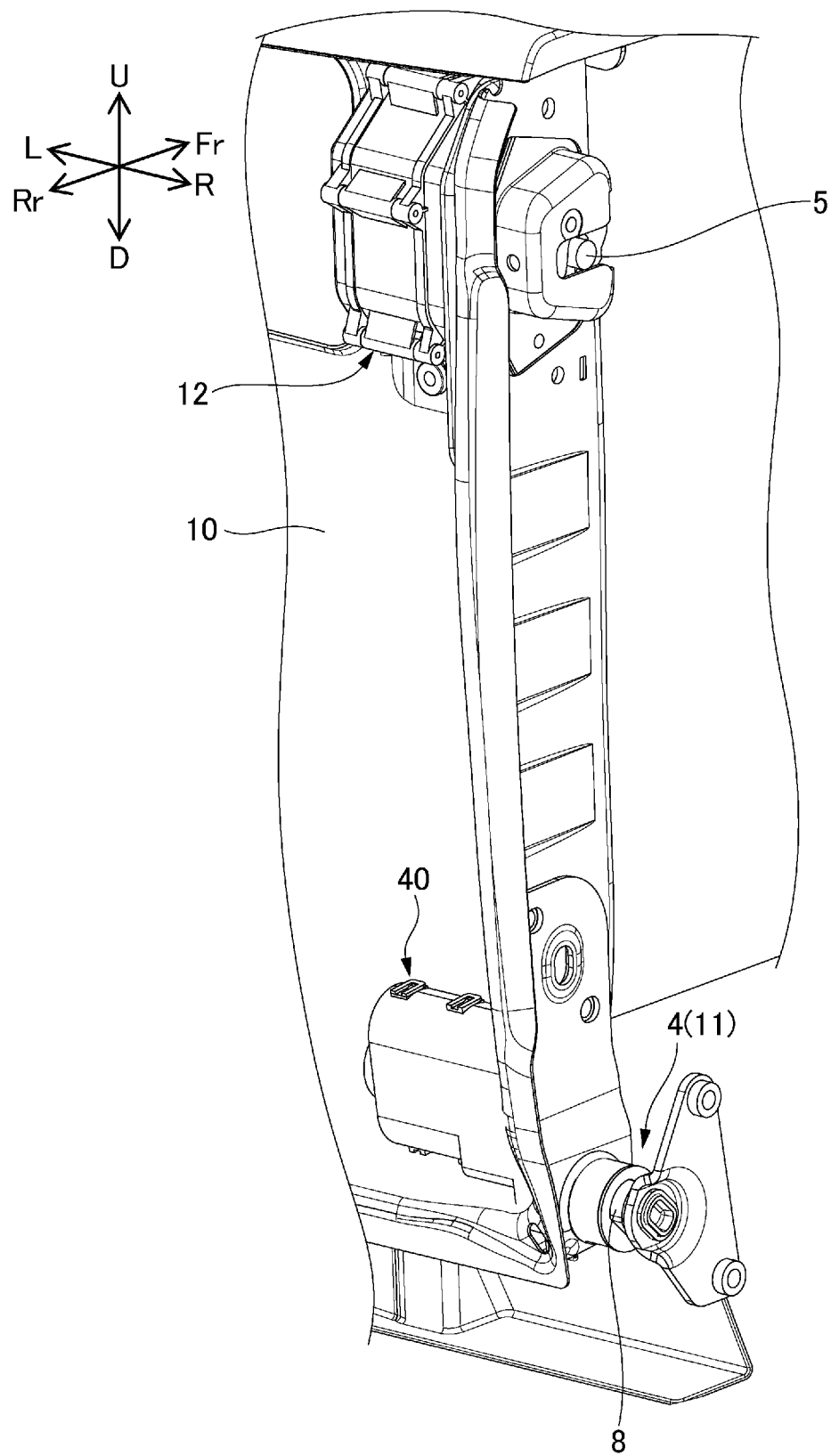
FIG. 2 is a perspective view of the opening/closing mechanism for the opening/closing member according to the embodiment of the present invention.

As shown in FIGS. 1 and 2, a loading space of a pick-up truck 1 is surrounded by a passenger compartment rear wall 2, which defines and forms a passenger compartment, and a pair of side walls 3, which face each other in a vehicle's width direction, at the front, left, and right of the loading space, respectively, and the rear of the loading space is selectively closed by the tail gate 10. FIG. 2 shows an interior of the tail gate 10 with a rear plate of the tail gate 10 removed.

The tail gate 10 is supported rotatably on the pair of side walls 3 by hinge portions 4, which are positioned at lower sides of rear end portions of the pair of side walls 3. In the present embodiment, a hinge portion 4 positioned on the right configures a hinge device 11 installed in an electric driving device 40, and this hinge device 11 can operate from a full open position to a half open position of the tail gate 10 by virtue of a driving force of the electric driving device 40 and can also operate from the half open position to the full open position of the tail gate 10 by virtue of the driving force of the electric driving device 40.

Latch devices 12, which are positioned at upper sides of the rear end portions of the pair of side walls 3, are brought into engagement with corresponding strikers 5 fixed to the side walls 3, whereby the tail gate 10 is held in a closed state on the pair of side walls 3. A motor 6 (refer to FIG. 4) is installed in each latch device 12, and then, the latch device 12 can operate from the half open position (a half latching position of the latch device 12: refer to FIG. 10 (c)) to a full close position of the tail gate 10 by virtue of a driving force of the motor 6 and can also operate from the full close position to the half open position (an unlatching position of the latch device 12: refer to FIG. 11 (c)) of the tail gate 10 by virtue of the driving force of the motor 6.

In FIG. 1, reference numeral 7 denotes a control unit (ECU) for controlling the electric driving device 40 and the motors 6 of the pair of latch devices 12. The control unit 7 includes a signal processing circuit, CPU (an arithmetic processing unit), a memory circuit, and the like and is configured to obtain positional information on the position of the tail gate 10 from three switches SW1 to SW3 (refer to FIG. 9) of the latch device 12, which will be described later, to thereby control the electric driving device 40 of the hinge device 11 and the motor 6 of each latch device 12 based on the positional information so obtained. The control unit 7 can electrically open or close the tail gate 10 in accordance with an intension of a user which is expressed through a button operation, a panel operation, or the like.

<Latch Device>

First of all, although the latch device 12 will be described below, since the left and right latch devices 12 have the same configuration, in the following description, of the pair of latch devices 12, only the latch device 12 provided at the right of the tail gate 10 will be described.

As shown in FIGS. 3 to 9, the latch device 12 includes a claw 210 configured to be brought into engagement with the striker 5, a ratchet 230 configured to rotate together with the claw 210 and hold the tail gate 10 in the half open state and the closed state as a result of a pawl 220 being brought into engagement with the ratchet 230, the motor 6, a driving force transmission mechanism 200 configured to switch the state of the tail gate 10 between the half open state and the closed state by virtue of the driving force of the motor 6, a housing 250 configured to house or accommodate the pawl 220, the ratchet 230, and the driving force transmission mechanism 200, a base plate 260 configured to accommodate the claw 210, and a back plate 270 interposed between a right side portion 250a of the housing 250 and the base plate 260.

Figure 3:
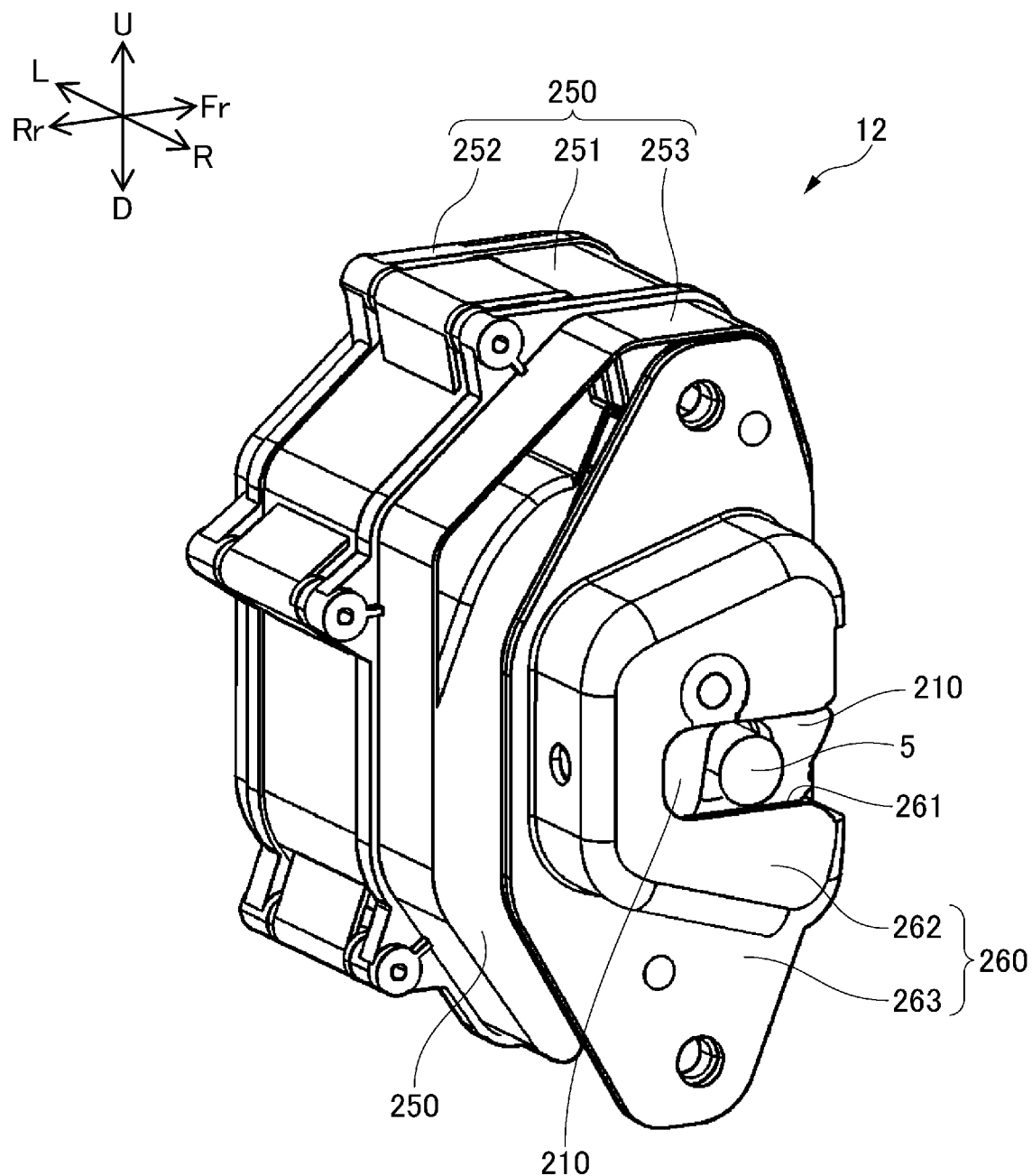
FIG. 3 is a perspective view of a latch device of the opening/closing mechanism for the opening/closing member shown in FIG. 2.
Figure 5:
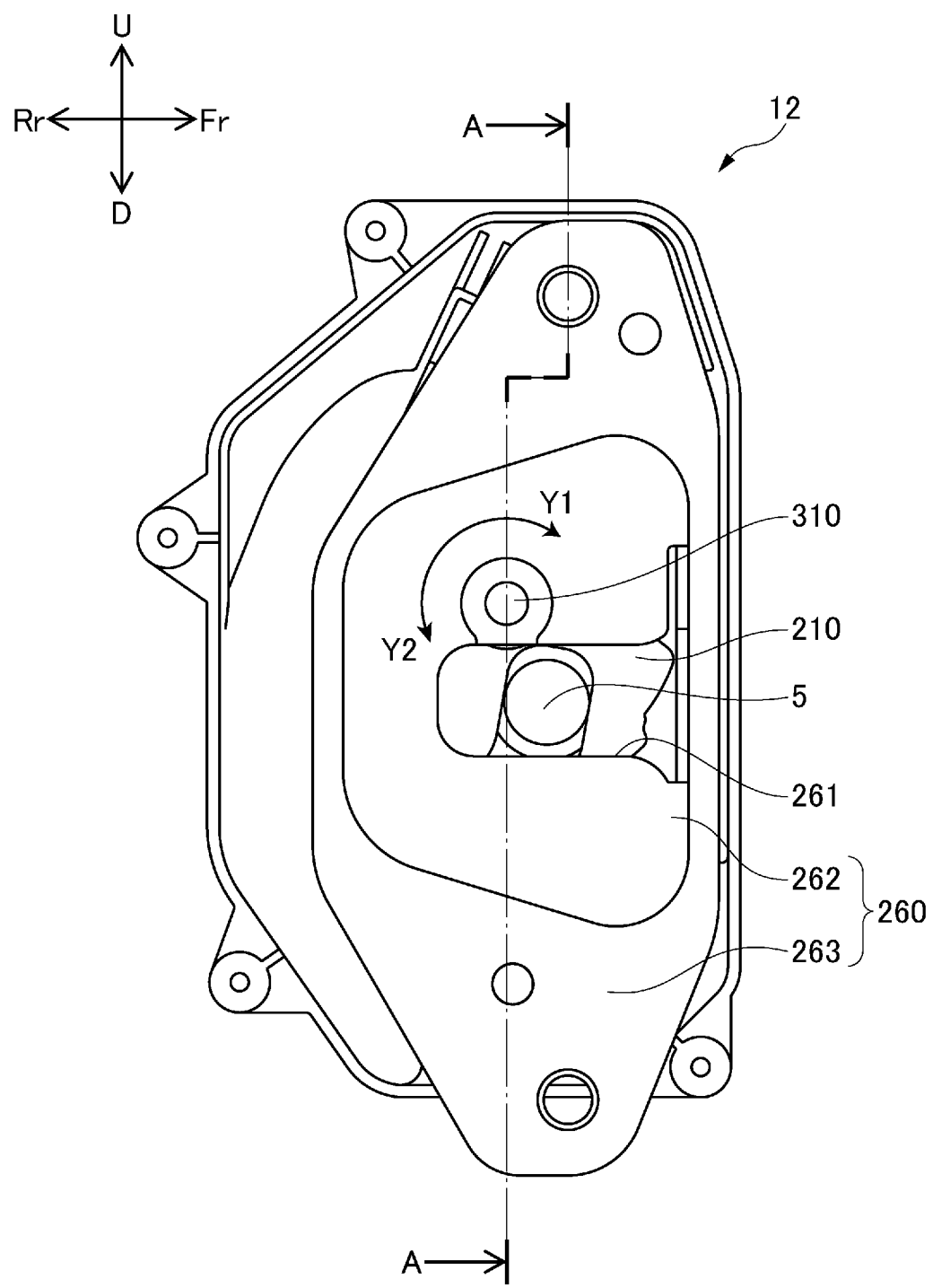
FIG. 5 is a right side view of the latch device shown in FIG. 3.
Figure 6:
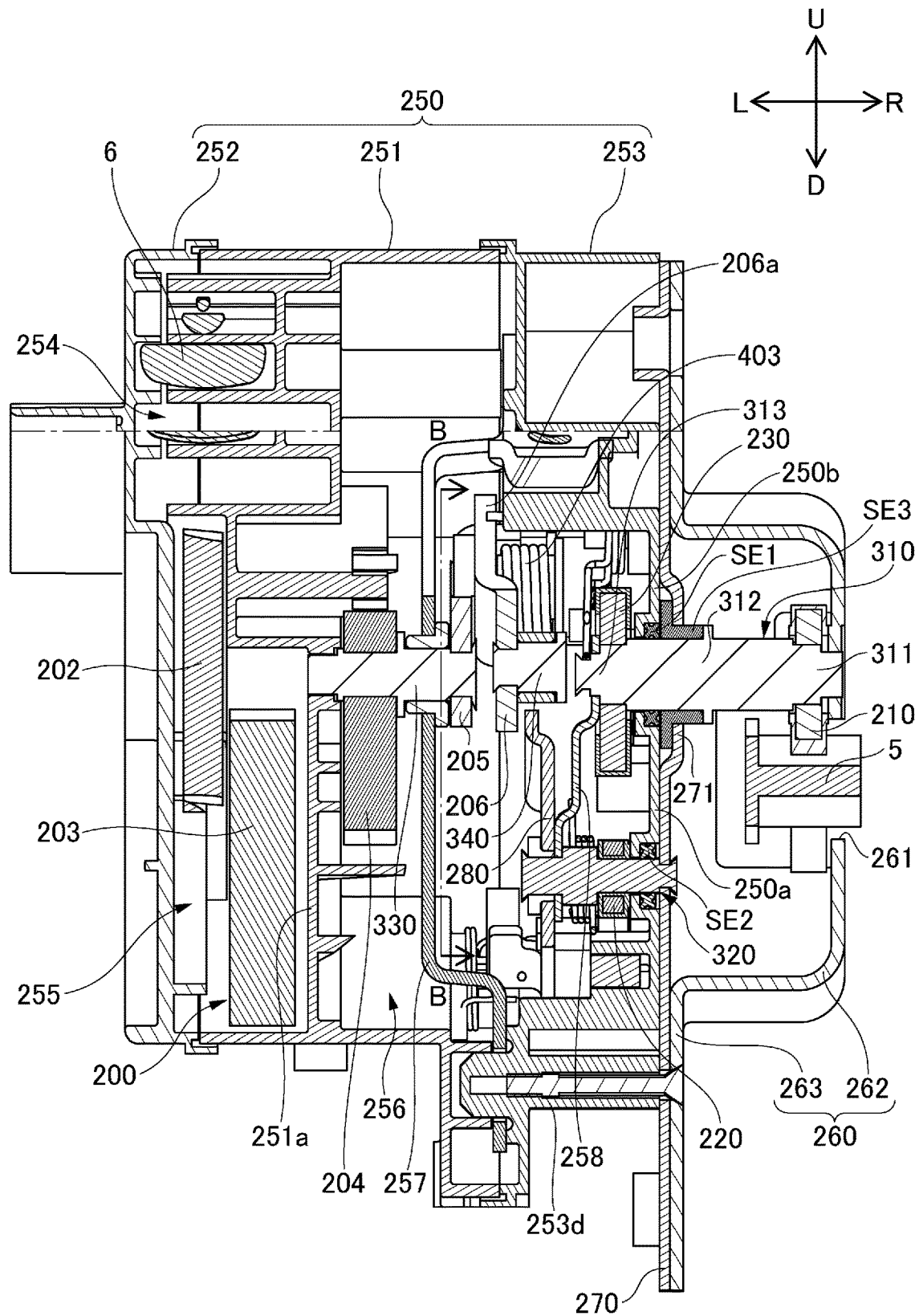
FIG. 6 is a sectional view taken along a line A-A in FIG. 5.

As shown in FIGS. 3, 5 and 6, the base plate 260 includes a bottomed cylindrical base plate main body 262 in which a striker receiving groove 261 for receiving the striker 5 is formed in a bottom surface and a base plate flange portion 263 that extends in an up-down direction from the base plate main body 262. The back plate 270 is provided at a side (a left side) of the base plate main body 262 which lies opposite to a side where the striker receiving groove 261 is formed to thereby define a space for accommodating the claw 210. The base plate 260 and the back plate 270 are fixed to the right side portion 250a of the housing 250, whereby the back plate 270 is interposed between the right side portion 250a of the housing 250 and the base plate 260.

Figure 4:
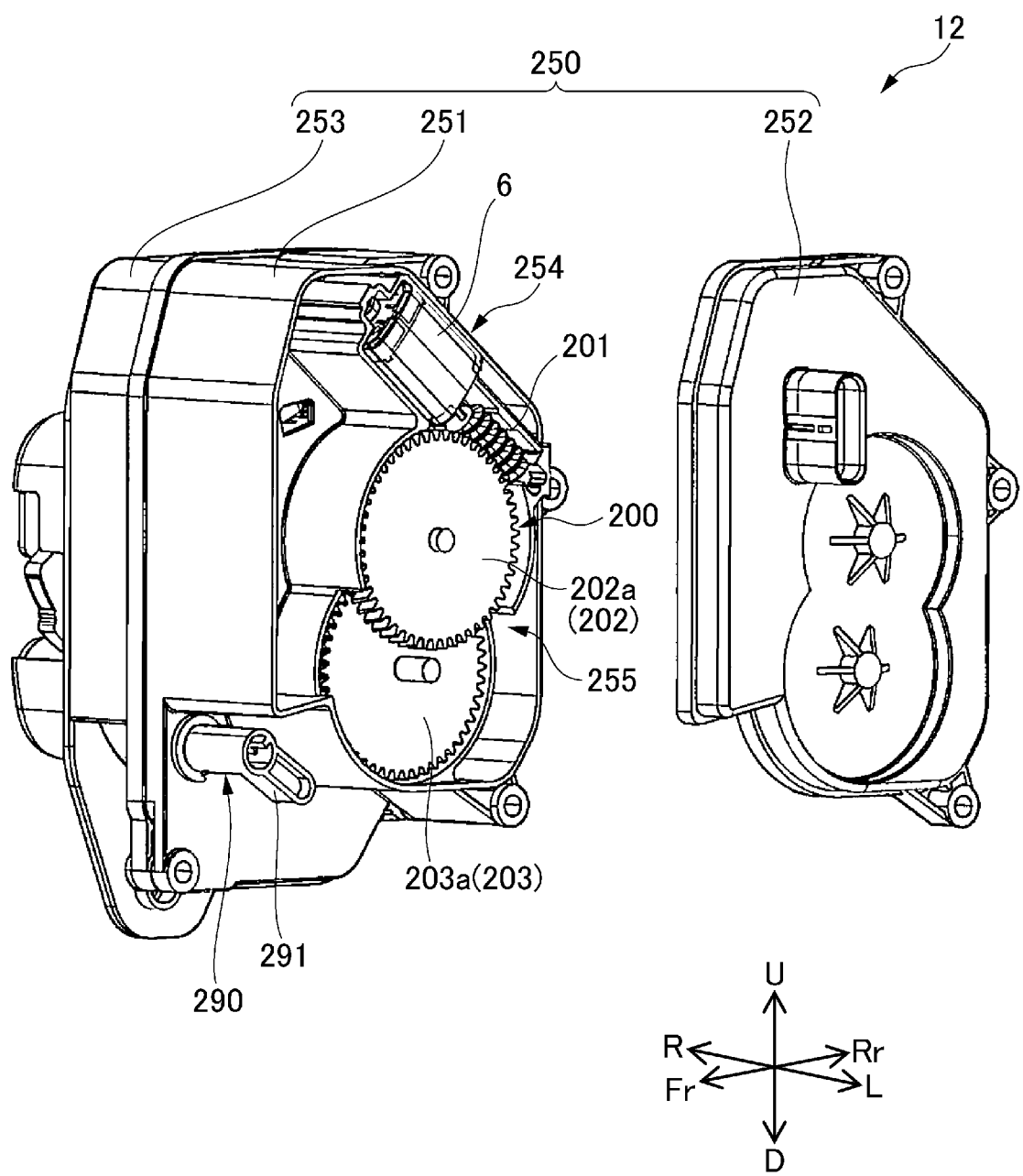
FIG. 4 is an exploded perspective view of the latch device shown in FIG. 3.

As shown in FIG. 6, the housing 250 includes a case 251 having a bulkhead portion 251a that divides an interior of the case 251 in a left-right direction, a cover 252 that is connected to a left side of the case 251, and a body 253 that is connected to a right side of the case 251. As shown in FIGS. 4 and 6, the cover 252 defines a motor accommodation portion 254 for accommodating the motor 6 and a first accommodation space 255 for accommodating a part of the driving force transmission mechanism 200 between the bulkhead portion 251a of the case 251 and itself. The body 253 defines a second accommodation space 256 for accommodating the pawl 220, the ratchet 230, and the remaining elements of the driving force transmission mechanism 200 between the bulkhead portion 251a of the case 251 and itself.

Figure 7:
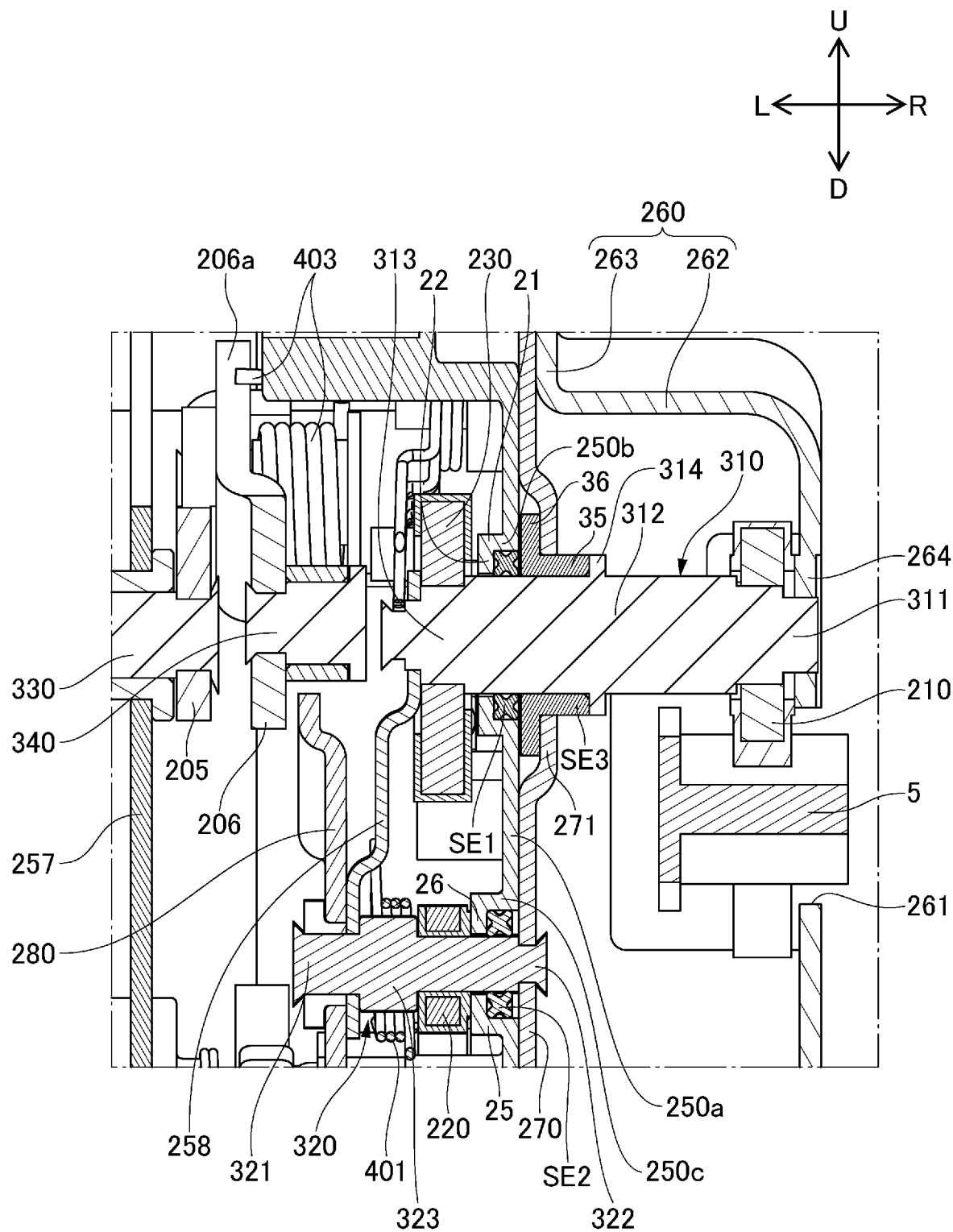
FIG. 7 is a partial enlarged view of FIG. 6.

A right side portion of the body 253 configures the right side portion 250a of the housing 250 to which the back plate 270 is attached. As shown in FIGS. 6 and 7, the claw 210 is fixed to a main shaft 310 in such a manner as to be positioned in a space defined between the base plate main body 262 and the back plate 270. The ratchet 230 is fixed to the main shaft 310 in such a manner as to be positioned in the second accommodation space 256. That is, the claw 210 and the ratchet 230 are supported on the main shaft 310 in such a manner as to rotate together with the main shaft 310.

The main shaft 310 is supported by a shaft support portion 264 formed on the base plate main body 262 of the base plate 260 at a right end portion 311 and is supported by a first shaft support portion 250b formed in the right side portion 250a (the right side portion of the body 253) of the housing 250 at an intermediate portion 312, which is positioned between the claw 210 and the ratchet 230. A first support plate 258 for supporting a pawl shaft 320 is attached to a left end portion 313 of the main shaft 310, which supports the ratchet 230, in such a manner as to rotate relatively. An interior of the housing 250, in which the ratchet 230 and the like are disposed, is sealed up from the space defined between the base plate 260 and the back plate 270. This waterproofing structure will be described later.

Figure 8:
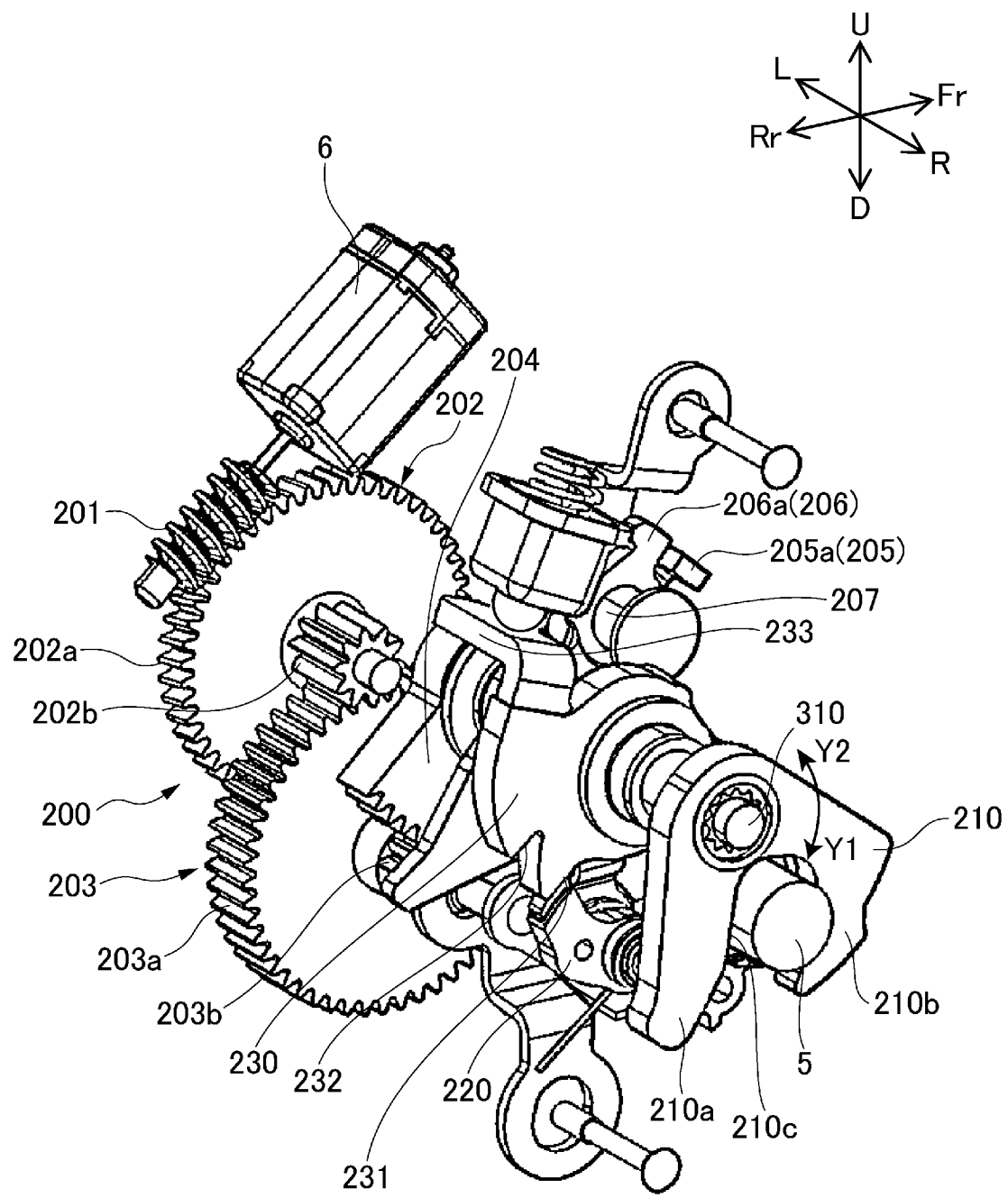
FIG. 8 is a perspective view showing internal constituent elements of the latch device shown in FIG. 3.

The claw 210 can rotate together with the ratchet 230 around the striker 5 in both directions, that is, in a meshing direction (a direction indicated by an arrow Y1 in FIGS. 5 and 8) and a meshing releasing direction (a direction indicated by an arrow Y2 in FIGS. 5 and 8). The claw 210 and the ratchet 230 are set in a plurality of positions including an unlatching position, a full latching position, and a half latching position lying between the unlatching position and the full latching position. As shown in FIG. 8, the claw 210 includes a first locking claw 210a and a second locking claw 210b, which extend generally in parallel, and an area where these locking claws 210a, 210b face each other is configured as a striker receiving portion 210c for receiving the striker 5.

When the striker 5 enters the striker receiving groove 261 of the base plate 260 at the time of closing the tail gate 10, the striker 5 enters the striker receiving portion 210c while pressing a facing surface of the first locking claw 210a of the claw 210 which lies on a side thereof which faces the striker receiving portion 210c. As a result, when the tail gate 10 is closed, the claw 210 is brought into meshing engagement with the striker 5 from the unlatching position and rotates about the main shaft 310 in the meshing direction (the direction indicated by the arrow Y1 in FIG. 8).

When the claw 210 rotates in the meshing direction, the ratchet 230 also rotates in the meshing direction together with the claw 210.

As shown in FIGS. 6 and 7, the pawl 220 is supported relatively rotatably on the pawl shaft 320 supported on the base plate 260. The pawl shaft 320 is disposed below the main shaft 310 and extends in the same direction as the direction in which the main shaft 310 extends. The pawl shaft 320 is supported by the first support plate 258 attached to the left end portion 313 of the main shaft 310 at a left end portion 321 thereof and is supported by a second shaft support portion 250c formed on the right side portion 250a (the right side portion of the body 253) of the housing 250 at a right end portion 322 thereof. The pawl 220, which is provided at an intermediate portion 323 of the pawl shaft 320, is configured to be able to rotate between an engagement position where the pawl 220 is brought into engagement with the ratchet 230 and a non-engagement position where the pawl 220 is not brought into engagement with the ratchet 230. This engagement position includes both a position where the pawl 220 is brought into engagement with the ratchet 230 in the half latching position and a position where the pawl 220 is brought into engagement with the ratchet 230 in the full latching position.

Figure 9:
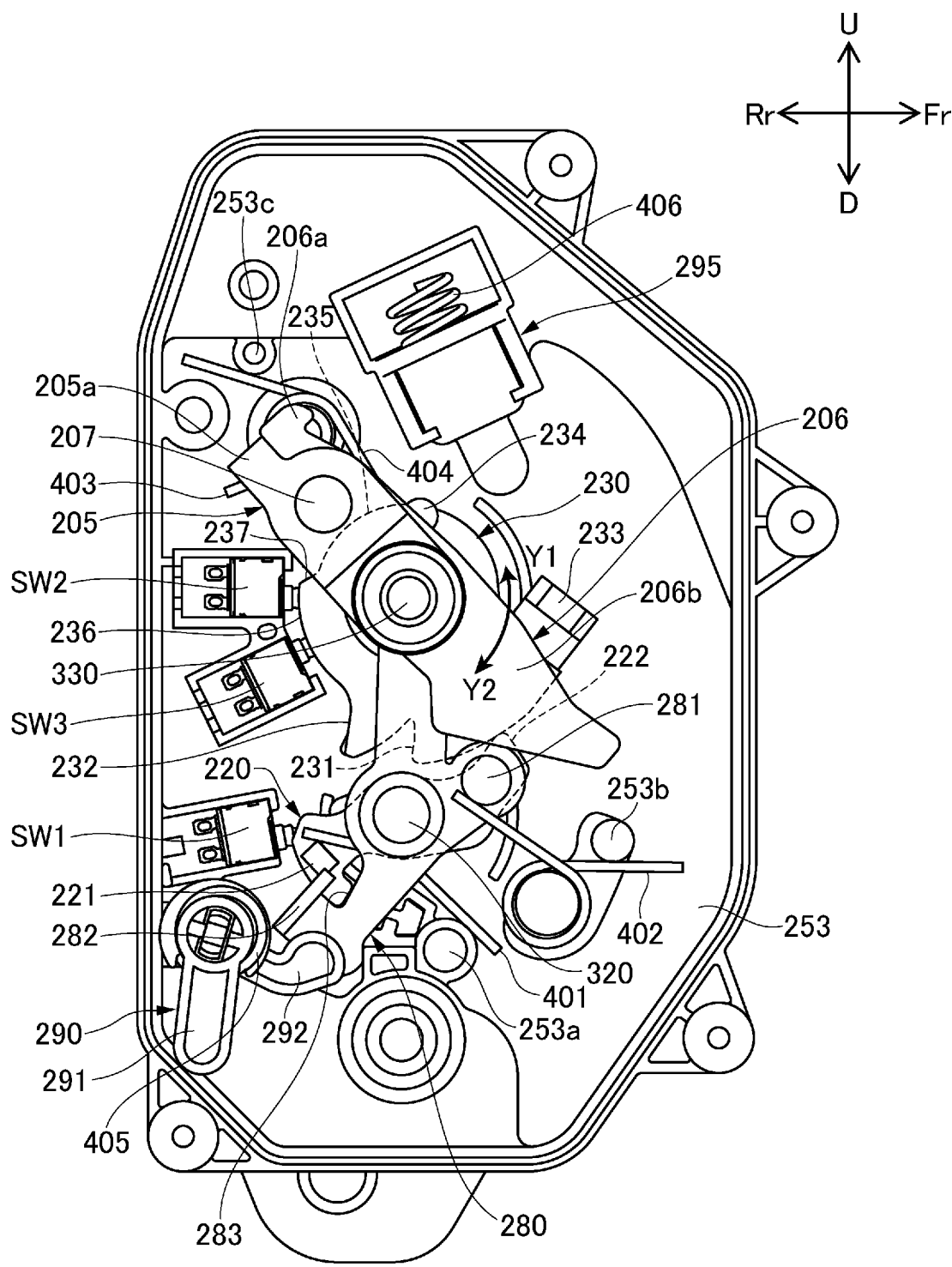
FIG. 9 is a view of the latch device shown in FIG. 6 as viewed from a direction B-B therein, showing the internal constituent elements of the latch device.

As shown in FIG. 9, the pawl 220 is biased in a counterclockwise direction towards the engagement positions (positions shown in FIGS. 10 (b)-10 (d)) where the pawl 220 is brought into engagement with the ratchet 230 by a torsion spring 401 (an elastic coil spring). To make this happen, one spring end portion of the torsion spring 401 is locked at a first spring engagement portion 253a of the body 253, while the other spring end portion of the torsion spring 401 is locked at a pawl projecting portion 221 on the pawl 220. FIGS. 9 to 13 (f) are views of the latch device 12 as seen from a different direction (a left side) from the direction in which the latch device 12 is seen in FIGS. 5 and 8, and hence, the meshing direction (the direction denoted by the arrow Y1) and the meshing releasing direction (the direction denoted by the arrow Y2) become opposite to those shown in FIGS. 5 and 8. In the present description, when the clockwise direction and the counterclockwise direction are referred to, they mean such directions based on the views shown in FIGS. 9 to 13 (f).

Returning to FIGS. 6 and 7, a release lever 280 is attached to the left end portion 321 of the pawl shaft 320 in such a manner as to rotate relatively. As shown in FIG. 9, this release lever 280 is biased in the counterclockwise direction towards an initial position (a position shown in FIG. 9) by a torsion spring 402 (an elastic coil spring). To make this happen, one spring end portion of the torsion spring 402 is locked at a second spring engagement portion 253b of the body 253, while the other spring end portion of the torsion spring 402 is locked at a release lever projecting portion 281 of the release lever 280.

An engaged or engagement target portion 282 is provided on a side of the release lever 280 which lies opposite to a side thereof where the release lever projecting portion 281 is provided across the pawl shaft 320 in such a manner as to be pushed upwards by an engagement piece 292 of an open lever 290, which will be described later. As a result of the engagement target piece 282 of the release lever 280 being pushed upwards against a biasing force of the torsion spring 402, the release lever 280 rotates in the clockwise direction from its initial position (a position shown in FIG. 9) to a release position (a position shown in FIG. 12 (c)). As a result, the pawl projecting portion 221 is pushed up onto an upper surface of an arm 283 of the release lever 280, whereby the pawl 220 rotates from the engagement position (positions shown in FIGS. 12 (a) and 12 (b)) towards the non-engagement position (a position shown in FIG. 12 (c)). When the pawl 220 stays in the engagement position, the pawl 220 is allowed to be brought into engagement with the ratchet 230 via an engagement piece 222, while when the pawl 220 stays in the non-engagement position, the engagement of the pawl 220 with the ratchet 230 is released.

When the claw 210 rotates from the unlatching position shown in (a) of FIG. 10 (a) about the main shaft 310 in the meshing direction to thereby be set in the full latching position shown in FIG. 10 (d), a second locking portion 232 of the ratchet 230 is brought into engagement with the engagement piece 222 of the pawl 220, whereby the claw 210 is positioned in the full latching position to thereby be prevented from rotating about the main shaft 310 in the meshing releasing direction (FIG. 13 (f)). That is, the claw 210 is prevented from rotating in the meshing releasing direction in the full latching position. As a result, the tail gate 10 is held in the closed state.

On the other hand, when the claw 210 stays in a position just prior to the full latching position shown in FIG. 10 (d), that is, the half latching position shown in FIG. 10 (b), the first locking portion 231 of the ratchet 230 is brought into engagement with the engagement piece 222 of the pawl 220, whereby the claw 210 is positioned in the half latching position to thereby be prevented from rotating about the main shaft 310 in the meshing releasing direction (in FIG. 13 (c)). That is, the claw 210 is prevented from rotating in the meshing releasing direction in the half latching position. As a result, the tail gate 10 is held in a so-called half open state, which occurs just prior to the closed state.

Returning to FIGS. 4, 6 and 8, the driving force transmission mechanism 200 functions to transmit the driving force of the motor 6 to the ratchet 230 for a cinching operation for rotating the claw 210 in the meshing direction from the half latching position where the claw 210 is in engagement with the striker 5 imperfectly to the full latching position where the claw 210 is in engagement with the striker 5 perfectly. This driving force transmission mechanism 200 is made up of a plurality of rotational driving members which are interposed on a driving force transmission path formed between the motor 6 and the ratchet 230 in such a manner as to be rotationally driven by the motor 6. The plurality of rotational driving members include a worm gear 201 provided on an output shaft of the motor 6, a first gear 202 having a worm wheel 202a configured to mesh with the worm gear 201 and a first pinion 202b, a second gear 203 having a spur gear 203a configured to mesh with the first pinion 202b and a second pinion 203b, a sector gear 204 configured to mesh with the second pinion 203b, an active lever 205, and a passive lever 206.

The first gear 202 and the spur gear 203a of the second gear 203 are accommodated in the first accommodation space 255 defined between the cover 252 and the bulkhead portion 251a of the case 251. The second pinion 203b of the second gear 203 and the sector gear 204 are accommodated in the second accommodation space 256 defined between the bulkhead portion 251a of the case 251 and the body 253. The power of the motor 6 is transmitted to the sector gear 204 by way of the worm gear 201, the worm wheel 202a, the first pinion 202b, the spur gear 203a, and the second pinion 203b.

The sector gear 204 is fixed to a sector gear shaft 330 which extends substantially coaxially with the main shaft 310. The sector gear shaft 330 is supported in the bulkhead portion 251a at a left end portion thereof and is supported in the second support plate 257, which is disposed between the body 253 and the case 251, in such a manner as to extend in the up-down direction at a right end portion thereof. The active lever 205 is attached to the sector gear shaft 330 on a side of the second support plate 257 which faces the body 253 (a right side thereof) in such a manner as to rotate together with the sector gear shaft 330. That is, when the sector gear 204 rotates, the active lever 205 also rotates together with the sector gear 204. The second support plate 257 is fixed at two upper and lower points with bolts which pass through the base plate flange portion 263 and the back plate 270 to thereby be fastened in place in bolt fastening portions 253d (only a lower one is shown in FIG. 6) of the body 253.

Referring to FIG. 9, too, the active lever 205 is connected to the passive lever 206, which is supported rotatably about an active lever shaft 340 disposed substantially coaxially with the sector gear shaft 330, with a connecting pin 207. In other words, the active lever 205 and the passive lever 206 are made to transmit power therebetween by way of the connecting pin 207. The connecting pin 207 is positioned above the sector gear shaft 330 and the active lever shaft 340 by a predetermined distance. A torsion spring 403 is provided on the connecting pin 207 on a side of the passive lever 206 which faces the body 253 (a right side thereof), and a relative rotation of the active lever 205 to the passive lever 206 is limited to a predetermined angle by the torsion spring 403. To make this happen, one spring end portion of the torsion spring 403 is locked on a spring engagement portion 205a at a distal end of the active lever 205, and the other spring end portion of the torsion spring 403 is locked on a spring engagement portion 206a at a distal end of the passive lever 206.

The passive lever 206 is a driven lever which is passively driven by the active lever 205, which functions as a driving lever. This passive lever 206 has an abutment arm 206b, which is configured to be brought into engagement with the engagement piece 233 of the ratchet 230 and the release lever projecting portion 281 of the release lever 280, on a side thereof which lies opposite to a side where the connecting pin 207 is provided across the active lever shaft 340. When the passive lever 206 rotates in the counterclockwise direction in a cinching operation, causing an upper surface of the abutment arm 206b to be brought into abutment with the engagement piece 233 of the ratchet 230, the ratchet 230 rotates in the counterclockwise direction. In association with this, the claw 210 meshes deeply with the striker 5 and rotates in the meshing direction. In addition, when the passive lever 206 rotates in the clockwise direction in a release operation, causing a lower surface of the abutment arm 206b to be brought into abutment with the release lever projecting portion 281 of the release lever 280, the release lever 280 rotates in the clockwise direction.

The ratchet 230 is biased so as to rotate in the clockwise direction towards its initial position (a position shown in FIG. 9) by a torsion spring 404 (an elastic coil spring). To make this happen, one spring end portion of the torsion spring 404 is locked on a third spring engagement portion 253c of the body 253, and the other spring end portion of the torsion spring 404 is locked on a ratchet projecting portion 234 of the ratchet 230.

Referring to FIG. 4, too, the open lever 290 is provided at a lower portion of the case 251 in such a manner as to lie below the first accommodation space 255 and the second accommodation space 256 with a handle 291 exposed outside. The open lever 290 is used to release manually a locked state of the tail gate 10 in which the tail gate 10 is held in the half open position or the full close position due to a failure of the motor 6 or the like, that is, a state in which the claw 210 is prevented from rotating in the meshing releasing direction. This open lever 290 is elastically biased in the clockwise direction so as to be held in its initial position (a position shown in FIG. 9) by a torsion spring 405. As shown in FIG. 9, the open lever 290 includes the engagement piece 292, which has been described above, provided in a position spaced away about 40 degrees from the handle 291 in such a manner as to extend towards the engagement target piece 282 of the release lever 280. As a result, when the handle 291 of the release lever 280 is rotated counterclockwise direction, the open lever 290 rotates in the counterclockwise direction against the biasing force of the torsion spring 405, whereby the engagement piece 292 pushes upwards the engagement target piece 282 of the release lever 280.

In addition, a popup member 295 including a compression spring 406 is provided in an upper portion of the second accommodation space 256 of the latch device 12. The popup member 295 is brought into abutment with the engagement piece 233 of the ratchet 230 when the claw 210 and the ratchet 230 are positioned in the full latching position (a position shown in FIG. 10 (d)) to thereby bias the ratchet 230 in such a manner as to rotate in the clockwise direction. Consequently, when the tail gate 10 stays in the closed state, the ratchet 230 is biased in the meshing releasing direction, that is, a direction in which the tail gate 10 is put in an open state by the torsion spring 404, which has been described above, and the popup member 295.

A first switch SW1 is provided on an outer circumferential portion of the pawl 220 in such a manner as to be brought into abutment with the pawl 220, and a second switch SW2 and a third switch SW3 are provided on an outer circumferential portion of the ratchet 230 in such a manner as to be brought into abutment with an outer circumferential surface of the ratchet 230. An outer circumferential step portion 237, configured to connect a small-diameter portion 235 with a large-diameter portion 236, is provided on the outer circumferential surface of the ratchet 230 in a position lying spaced away from the first locking portion 231 and the second locking portion 232. The switches SW1 to SW3 are switched on and off as the pawl 220 and the ratchet 230 rotate.

A relationship between the states of the switches SW1 to SW3 and the positions of the pawl 220 and the ratchet 230 will be described by reference to FIGS. 13 (a)-13 (f).

All the switches SW1 to SW3 are switched on in a state shown in FIG. 13 (a) in which the ratchet 230 stays in the unlatching position, that is, a state in which the tail gate 10 is fully opened.

As shown in FIG. 13 (b), when the tail gate 10 rotates from this state by a predetermined angle in the closing direction to thereby cause the striker 5 to be brought into engagement with the claw 210 and the ratchet 230 rotates in the counterclockwise direction as the claw 210 so rotates, the second switch SW2, which is in abutment with the large-diameter portion 236 of the ratchet 230, moves over the outer circumferential step portion 237 to thereby be switched off.

Further, when the tail gate 10 rotates further by a predetermined angle in the closing direction to thereby be put in the half open state as shown in FIG. 13 (c), that is, the latch device 12 is positioned in the half latching position where the first locking portion 231 of the ratchet 230 is brought into engagement with the engagement piece 222 of the pawl 220, the first switch SW1, which is in abutment with the outer circumferential surface of the pawl 220, is then switched off.

When the tail gate 10 rotates further by a predetermined angle in the closing direction from the half open state as shown in FIG. 13 (d), the pawl 220 rotates clockwise direction, whereby the first switch SW1 is switched on again.

When the tail gate 10 rotates further by a predetermined angle in the closing direction from the state shown in FIG. 13 (d) to thereby be put in a state which would result just prior to the closed state of the tail gate 10 as shown in FIG. 13 (e), the third switch SW3, which is in abutment with the large-diameter portion 236 of the ratchet 230, also moves over the outer circumferential step portion 237 to thereby be switched off.

When the tail gate 10 rotates further by a predetermined angle in the closing direction from the state shown in FIG. 13 (e) to thereby be put in a closed state as shown in FIG. 13 (f), the first switch SW1, which is in contact with the outer circumferential surface of the pawl 220, is switched off, whereby all the switches SW1 to SW3 are switched off.

Hereinafter, a cinching operation, a release operation, and an override operation of the latch device 12 configured as described heretofore will be described.

[Cinching Operation]

First of all, a cinching operation of the latch device 12 will be described by reference to FIGS. 10 (a)-10 (d).

As shown in FIG. 10 (a), when the tail gate 10 stays in the full open state, the claw 210 and the ratchet 230 are positioned in the unlatching position.

When the tail gate 10 is rotated from this state by means of a driving force of the electric driving device 40 of the hinge device 11, the striker 5 is brought into engagement with the claw 210, and the ratchet 230 rotates in the counterclockwise direction as the claw 210 so rotates. Then, the engagement piece 222 of the pawl 220 is brought into engagement with the first locking portion 231 of the ratchet 230 (FIG. 13 (c)), whereby the claw 210 and the ratchet 230 are positioned in the half latching position (FIG. 10 (b)). In this state, the claw 210 is prevented from rotating in the meshing releasing direction, whereby the tail gate 10 is held in the half open state.

When the control unit 7 recognizes the half open state (FIG. 13 (c)) of the tail gate 10 from the states of the three switches SW1 to SW3, the control unit 7 causes the motor 6 of the latch device 12 to be driven in a forward rotating direction (the closing direction). The passive lever 206 is caused to rotate in the counterclockwise direction via the driving force transmission mechanism 200, which has been described before, by means of the driving force of the motor 6, and then, the abutment arm 206b of the passive lever 206 is brought into abutment with the engagement piece 233 of the ratchet 230 (a cinching operation starting position in FIG. 10 (c)).

When the motor 6 is driven further in the forward rotating direction (the closing direction), the abutment arm 206b of the passive lever 206 pushes on the engagement piece 233 of the ratchet 230, causing the ratchet 230 to rotate in the counterclockwise direction. When the engagement piece 222 of the pawl 220 is brought into engagement with the second locking portion 232 of the ratchet 230 (FIG. 13 (f)), the claw 210 and the ratchet 230 are positioned in the full latching position (FIG. 10 (d)). In this state, the claw 210 is prevented from rotating in the meshing releasing direction, whereby the tail gate 10 is held in the closed state.

[Release Operation]

Next, a release operation of the latch device 12 will be described by reference to FIGS. 11 (a)-11 (c).

The motor 6 is driven in a reverse or backward rotating direction (an opening direction) from the full latching position (the closed state of the tail gate 10) of the claw 210 and the ratchet 230 shown in FIG. 11 (a). The passive lever 206 is caused to rotate in the clockwise direction via the driving force transmission mechanism 200, which has been described before, by means of the driving force of the motor 6, and then, a lower surface of the abutment arm 206b of the passive lever 206 is brought into abutment with the release lever projecting portion 281 of the release lever 280 (a release operation starting position shown in FIG. 11 (b)).

When the motor 6 is further driven in the backward rotating direction (the opening direction), the abutment arm 206b of the passive lever 206 pushes on the release lever projecting portion 281 of the release lever 280 to thereby cause the release lever 280 to rotate in the clockwise direction. When the release lever 280 rotates in the clockwise direction, the arm 283 of the release lever 280 is brought into abutment with the pawl projecting portion 221 of the pawl 220 to thereby cause the pawl 220 to rotate in the clockwise direction. When the pawl 220 rotates in the clockwise direction, the engagement piece 222 of the pawl 220 is disengaged from the second locking portion 232 of the ratchet 230. As this occurs, the ratchet 230 is pushed out in a lock releasing direction, that is, in the clockwise direction by means of the biasing forces of the torsion spring 404 and the popup member 295.

When the meshing of the engagement piece 222 of the pawl 220 with the ratchet 230 is released, the ratchet 230 is caused to rotate in the clockwise direction by the torsion spring 404, and further, when the tail gate 10 is caused to rotate in the opening direction by means of the driving force of the electric driving device 40 of the hinge device 11, the striker 5 is disengaged from the claw 210, and then, the claw 210 and the ratchet 230 are positioned in the unlatching position (an unlatching position in FIG. 11 (c)), whereby the tail gate 10 is put in a full open state.

[Override Operation]

Next, an override operation of the latch device 12 will be described by reference to FIGS. 12 (a)-12 (c).

An override operation is an operation intended to be executed to open the tail gate 10 manually in the event that the release operation described above cannot be executed as a result of the motor 6 being unable to be driven for some reason with the claw 210 and the ratchet 230 being prevented from rotating in the meshing releasing direction as in the full latching position (the closed state of the tail gate 10) or the half latching position (the half open state of the tail gate 10).

FIG. 12 (a) is an explanatory diagram showing the cinching operation starting position shown in FIG. 10 (c). In this state, the engagement piece 222 of the pawl 220 is in engagement with the first locking portion 231 of the ratchet 230, and the claw 210 and the ratchet 230 are prevented from rotating in the meshing releasing direction.

When the handle 291 of the open lever 290, which is exposed to the outside of the housing 250, is rotated in the counterclockwise direction, the engagement piece 292 rotates in the counterclockwise direction and then pushes upwards the engagement target piece 282 of the release lever 280 (FIG. 12 (b)). When the engagement target piece 282 is pushed upwards, causing the release lever 280 to rotate in the clockwise direction, the arm 283 of the release lever 280 pushes upwards the pawl projecting portion 221 of the pawl 220. Then, the pawl 220 is caused to rotate in the clockwise direction, whereby the engagement piece 222 of the pawl 220 is disengaged from the first locking portion 231 of the ratchet 230.

When the meshing of the engagement piece 222 of the pawl 220 with the ratchet 230 is released, the ratchet 230 is caused to rotate in the clockwise direction by the torsion spring 404, whereby the tail gate 10 can be opened with the rotational driving members of the driving force transmission mechanism 200 standing idle by manually pushing downwards the tail gate 10.

<Hinge Device>

As shown in FIGS. 2 and 14 to 16, the hinge device 11 is provided on the tail gate 10 and includes the electric driving device 40 for rotating the tail gate 10 by means of a driving force of a motor 41 (refer to FIG. 17) and a coupling 50 for coupling a body-side engagement portion 8, which is provided on the right side wall 3, and an output shaft 42 of the electric driving device 40 together.

Figure 16:
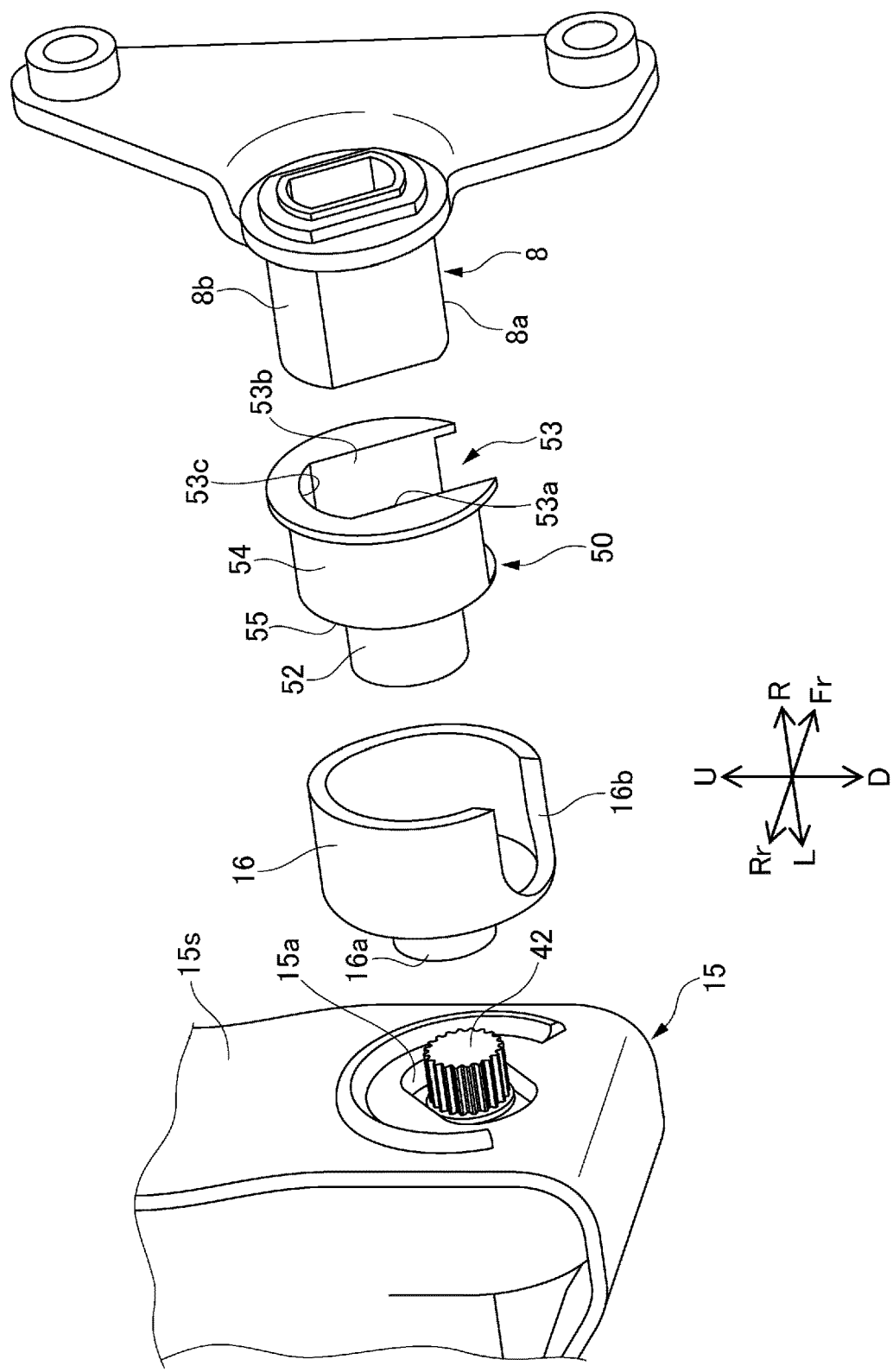
FIG. 16 is an exploded perspective view of the hinge device shown in FIG. 14.

An L-shaped stay 15 is fixed to the tail gate 10 in a position facing the body-side engagement portion 8 with the tail gate 10 kept in the closed state. The L-shaped stay 15 includes a side plate 15s extending along a right side surface of the tail gate 10 and a bottom plate 15b extending along a bottom surface of the tail gate 10, and has substantially an L-shape. As shown in FIG. 16, a non-circular hole portion 15a is provided in the side plate 15s of the L-shaped stay 15, and a fixing portion 16a of a collar 16 fits in the hole portion 15a in such a manner as not to rotate relative to the hole portion 15a. The coupling 50, which couples the body-side engagement portion 8 and the output shaft 42 of the electric driving device 40 together, penetrates into an interior of the collar 16 having a circularly cylindrical shape in such a manner as to rotate relatively. Consequently, when a user opens or closes the tail gate 10 manually, the tail gate 10 can be permitted to be manually operated by the L-shaped stay 15 and the collar 16 rotating relative to the coupling 50.

Figure 15:
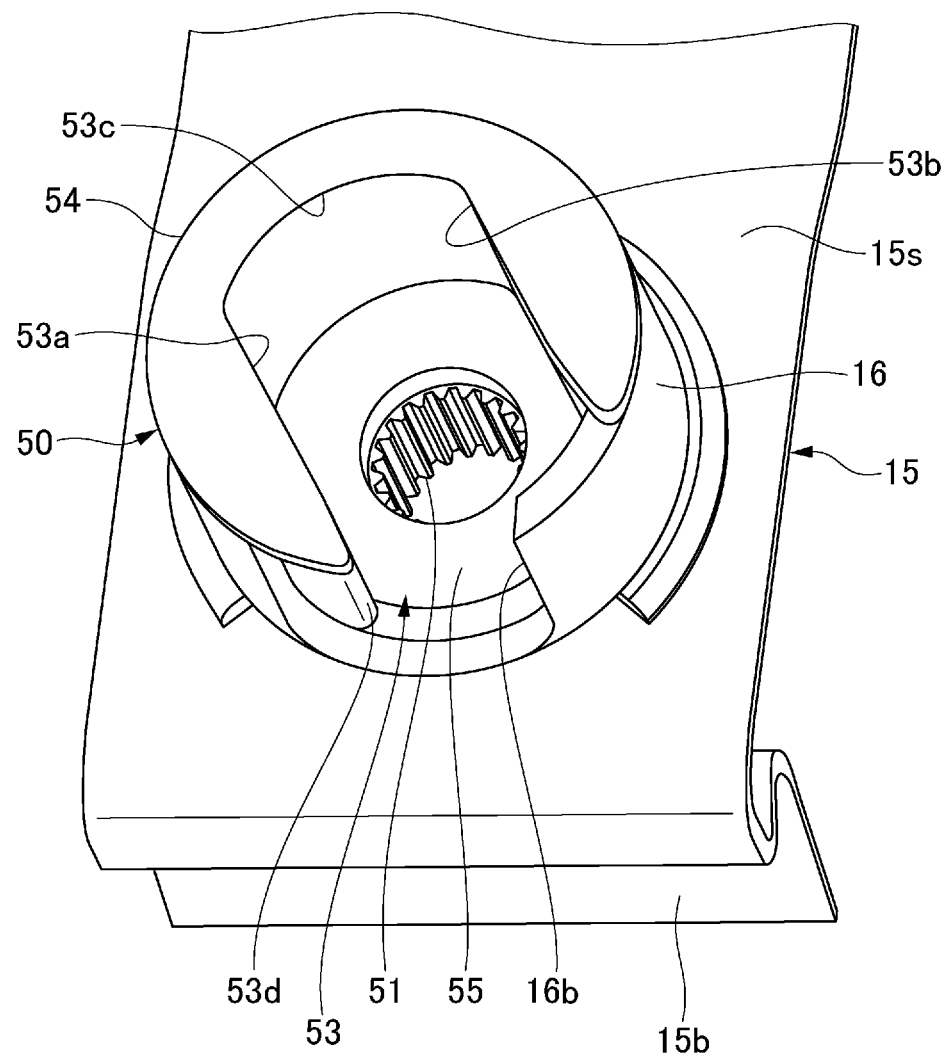
FIG. 15 is an enlarged view of a coupling of the hinge device shown in FIG. 14.

As shown in FIGS. 15 and 16, a first cylindrical portion 52, having a fitting hole portion 51 formed therein, to which the output shaft 42 of the electric driving device 40 is spline fit, is provided at a left end side on the coupling 50, while a second cylindrical portion 54, having a fitting recessed portion 53 formed therein to fit on the body-side engagement portion 8, is provided at a right end side of the coupling 50, and the first cylindrical portion 52 and the second cylindrical portion 54 are coupled together at a coupling portion 55.

A spline is formed on an inner circumferential surface of the fitting hole portion 51 in the first cylindrical portion 52 of the coupling 50 in such a manner as to fit in or on a spline formed on an outer circumferential surface of the output shaft 42 of the electric driving device 40, whereby the driving force of the motor 41 is transmitted to the coupling 50.

The fitting recessed portion 53 of the second cylindrical portion 54 of the coupling 50 includes two facing flat surfaces 53a, 53b, an arcuate surface 53c connecting the two flat surfaces 53a, 53b together, and an opening portion 53d which opens in an opposite side to the side where the arcuate surface 53c is provided. Two flat surfaces 8a, 8b formed on the body-side engagement portion 8 fit in between the two flat surfaces 53a, 53b of the fitting recessed portion 53. The tail gate 10 is attached to the loading space of the pick-up truck 1 by inserting the body-side engagement portion 8 into the opening portion 53d of the coupling 50 at the right hinge portion 4 with the left hinge portion 4 left in engagement with the left side wall 3. On the contrary, the tail gate 10 can be removed from the loading space of the pick-up truck 1 by removing the body-side engagement portion 8 from the opening portion 53d of the coupling 50. A cutout 16b is provided in the collar 16, too, in such a manner as to expand over a predetermined angular range so that the tail gate 10 can be assembled to and removed from the loading space only at an angle at which the cutout 16b of the collar 16 and the opening portion 53d of the coupling 50 are superposed.

In the latch device 11 configured as described heretofore, when the motor 41 of the electric driving device 40 starts rotating in response to a request from the user to operate the tail gate 10 electrically, the driving force of the motor 41 is transmitted from the output shaft 42 of the electric driving device 40 to the coupling 50. However, since the body-side engagement portion 8 is fitted in the fitting recessed portion 53 of the second cylindrical portion 54 of the coupling 50, the coupling 50 is restricted from rotating, whereby the tail gate 10, to which the electric driving device 40 is fixed, is caused to rotate by means of a reaction force. When opening the tail gate 10, the control unit 7 causes the motor 41 to rotate in a first direction, while when closing the tail gate 10, the control unit 7 causes the motor 41 to rotate in a second direction which is opposite to the first direction.

With the coupling 50 of the hinge device 11 of the present embodiment, since the output shaft 42 of the electric driving device 40 fits in the fitting hole portion 51 of the first cylindrical portion 52 and the body-side engagement portion 8 fits in the fitting recessed portion 53 of the second cylindrical portion 54, the driving force of the motor 41 can be transmitted as required to the body-side engagement portion 8 via the coupling 50. In addition, compared with the conventional case in which the torque bar is fitted in the coupling 50, the number of components involved can be reduced, thereby making it possible to suppress the enlargement in size of the hinge device 11.

Figure 14:
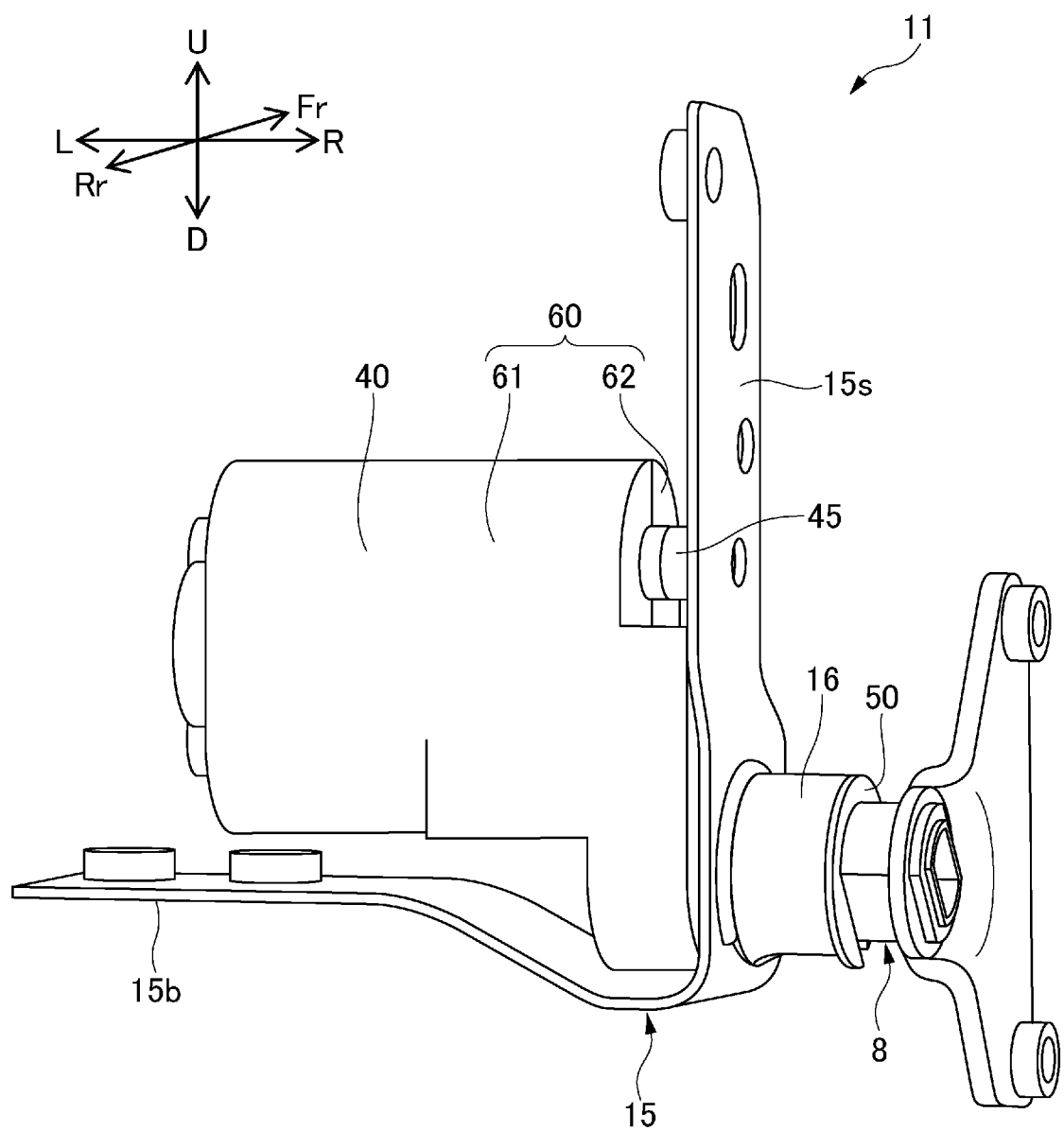
FIG. 14 is a perspective view of a hinge device of the opening/closing mechanism for the opening/closing member shown in FIG. 2.
Figure 17:
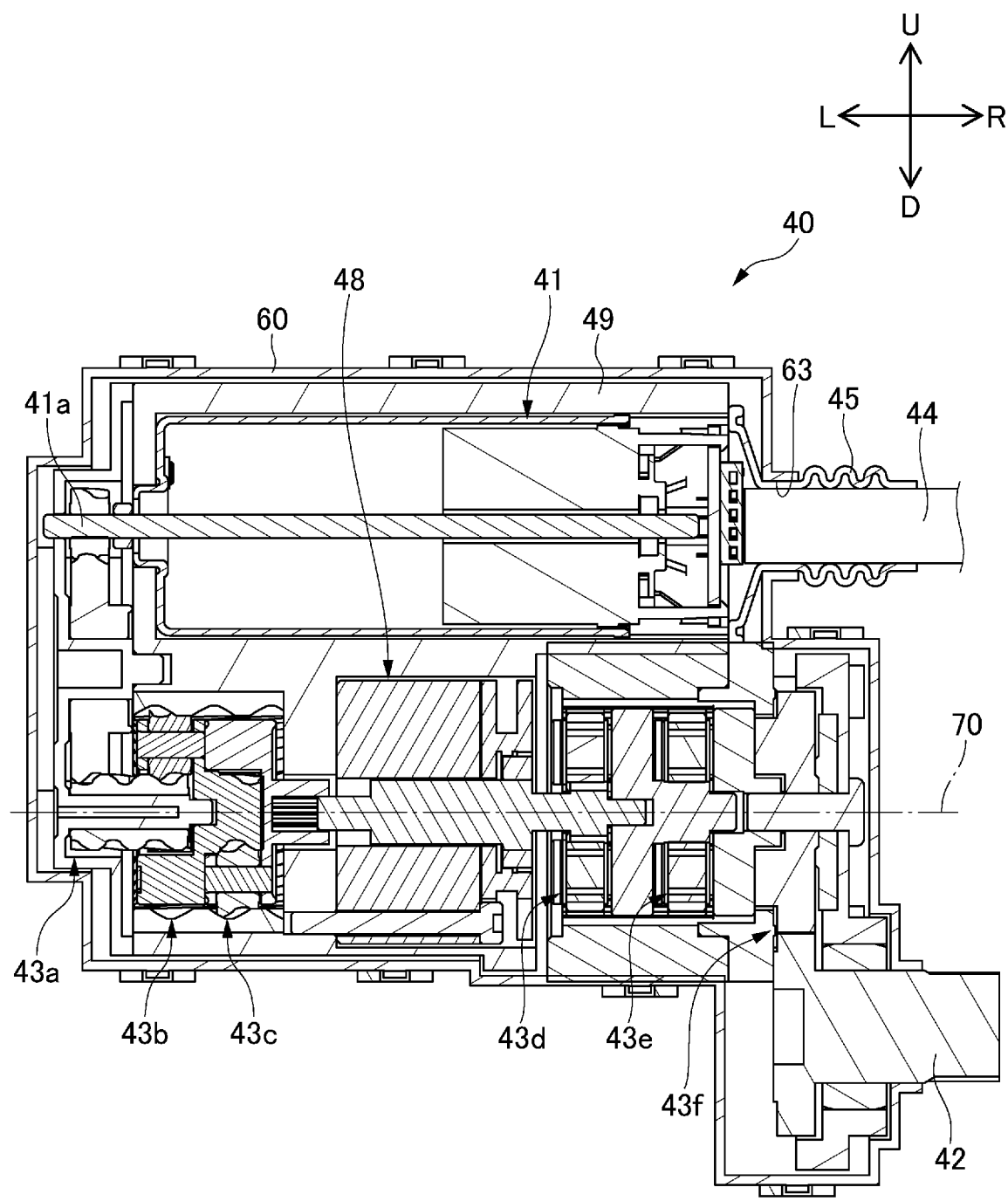
FIG. 17 is a sectional view of an electric driving device according to a first example.

FIGS. 14 and 17 show an electric driving device 40 according to a first example.

The electric driving device 40 of the first example includes a motor 41, a plurality of reduction gear mechanisms 43a to 43f for decelerating the rotation of the motor 41 between an output shaft 41a of the motor 41 and an output shaft 42 of the electric driving device 40, a clutch 48 capable of cutting off the transmission of power between the output shaft 41a of the motor 41 and the output shaft 42 of the electric driving device 40, a motor housing 49 for accommodating these constituent elements, and a waterproof shell 60 for surrounding the motor housing 49.

In the electric driving device 40, the output shaft 41a of the motor 41 and the output shaft 42 of the electric driving device 40 are disposed spaced apart vertically from each other, and further, a main rotational axis 70 of the electric driving device 40 is positioned between both the output shafts 41a, 42. A first reduction gear mechanism 43a, made up, for example, of a plurality of gear wheels and configured to decelerate the rotation of the motor 41 between the output shaft 41a of the motor 41 and itself, is provided at a left end portion of the main rotational axis 70, and a final reduction gear mechanism 43f, made up, for example, of a pair of gear wheels and configured to decelerate the rotation of the motor 41 between the output shaft 42 of the electric driving device 40 and itself, is provided at a right end portion of the main rotational axis 70. A second reduction gear mechanism 43b to a fourth reduction gear mechanism 43e, which are each made up, for example, of a planetary gear mechanism, and a clutch 48 are provided along the main rotational axis 70 between the first reduction gear mechanism 43a and the final reduction gear mechanism 43f.

The clutch 48 is, for example, an electromagnetic clutch and is caused to be engaged and released (disengaged) by the control unit 7. When driving the motor 41 of the electric driving device 40 in response to a request from the user to electrically operate the tail gate 10, the control unit 7 causes the clutch 48 to be engaged. On the other hand, when the user manually opens or closes the tail gate 10, the control unit 7 causes the clutch 48 to be released (disengaged), whereby the motor 41 is prevented from being entrained in association with the rotation of the tail gate 10.

In FIG. 17, reference numeral 44 denotes an electric power supply line connected to a battery, not shown, to supply electric power to the motor 41. The electric power supply line 44 passes through a grommet 45 provided on the motor housing 49 and extends to an exterior of the waterproof shell 60. As shown in FIG. 14, the waterproof shell 60 includes a first shell 61 and a second shell 62, which are divided a front-and-rear direction, and the motor housing 49 is surrounded by assembling them together. The motor housing 49 does not have to be fully surrounded by the waterproof shell 60, and hence, for example, the final reduction gear mechanism 43f may be exposed from the motor housing 49 in such a manner as to be covered by the waterproof shell 60.

Figure 18:
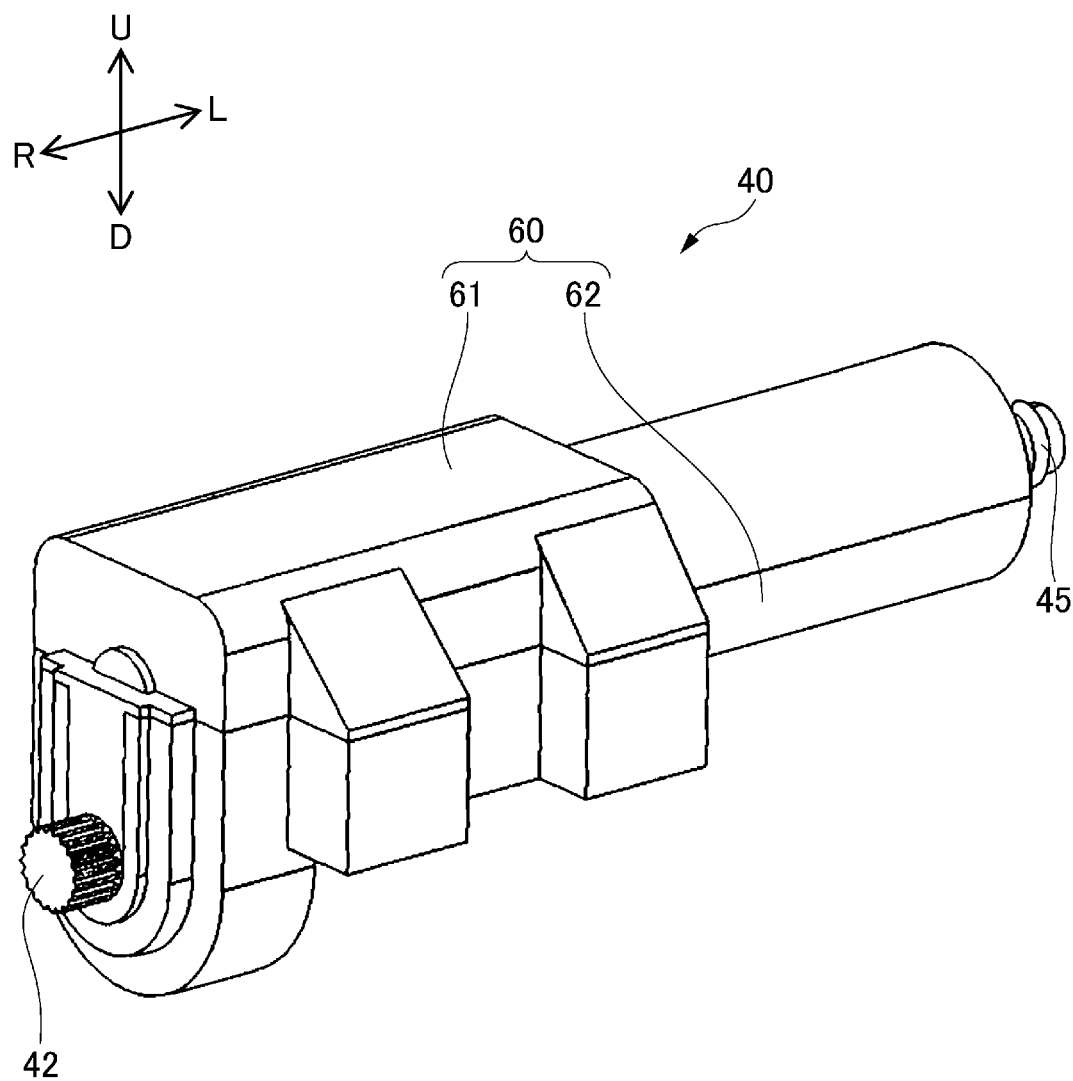
FIG. 18 is a perspective view of an electric driving device according to a second example.
Figure 19:
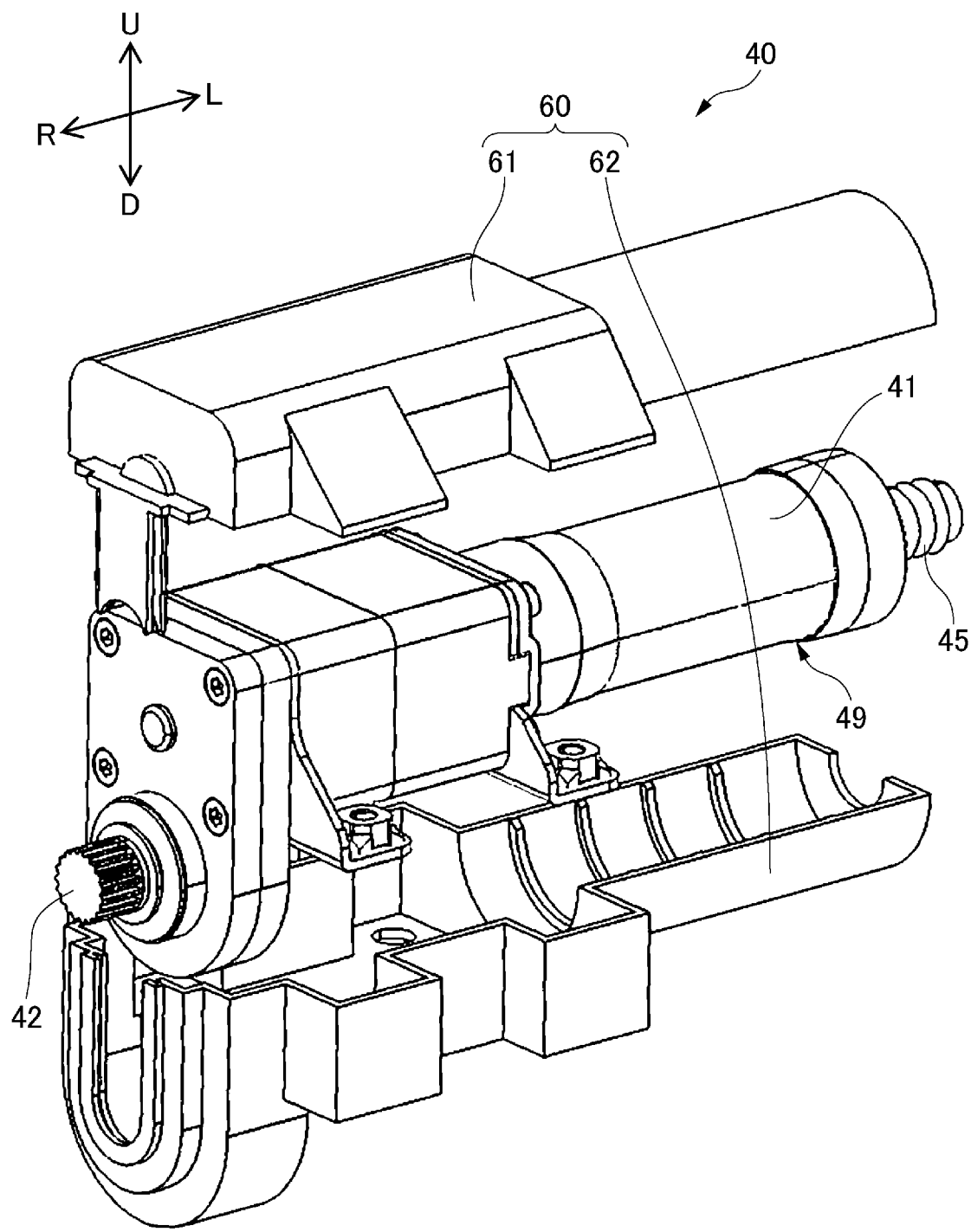
Figure 20:
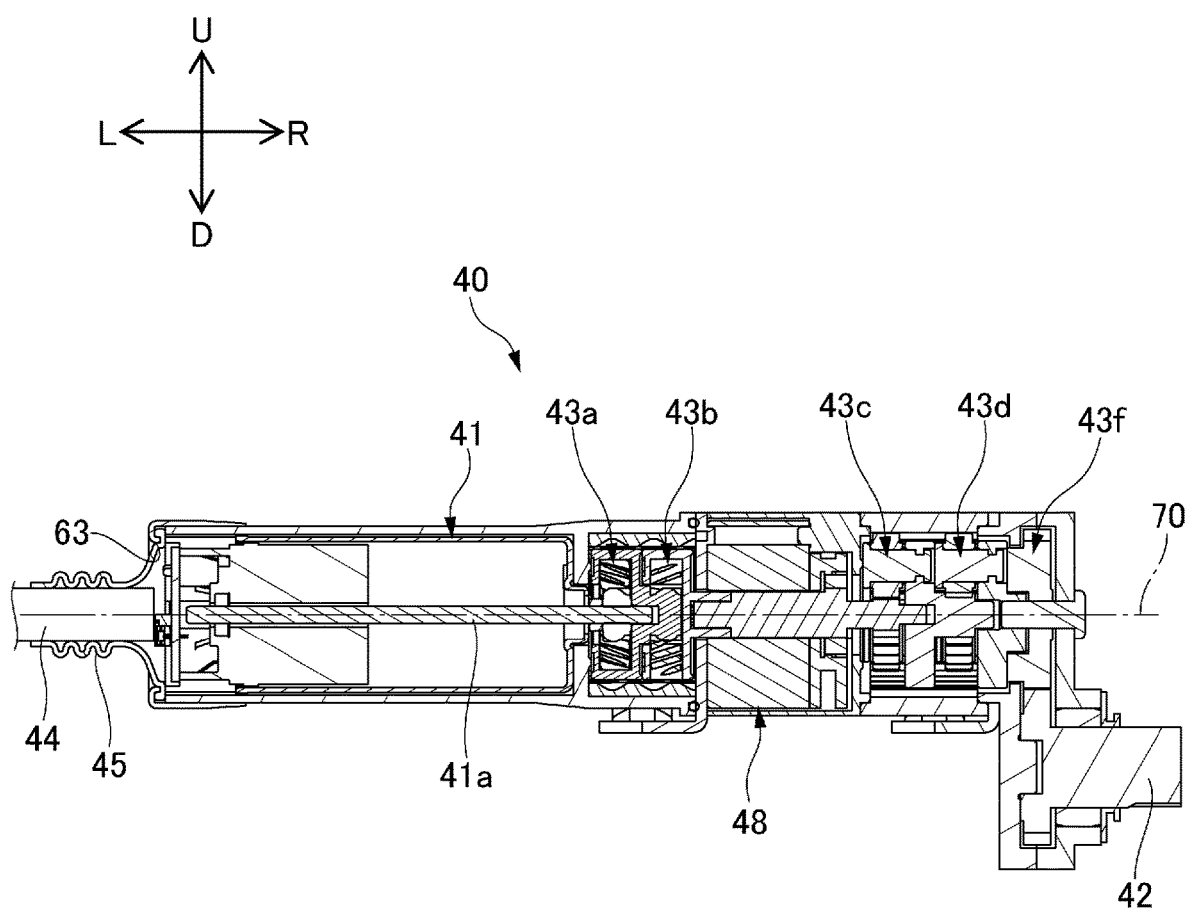
FIG. 20 is a sectional view of the electric driving device shown in FIG. 18.

FIGS. 18 to 20 show an electric driving device 40 according to a second example.

The electric driving device 40 of the second example differs from the electric driving device 40 of the first example in that an output shaft 41a of a motor 41 and a main rotational axis 70 are disposed on the same axis.

The electric driving device 40 of the second example includes the motor 41, a plurality of reduction gear mechanisms 43a to 43f for decelerating the rotation of the motor 41 between the output shaft 41a of the motor 41 and an output shaft 42 of the electric driving device 40, a clutch 48 capable of cutting off the transmission of power between the output shaft 41a of the motor 41 and an output shaft 42 of the electric driving device 40, a motor housing 49 for accommodating these constituent elements, and a waterproof shell 60 for surrounding the motor housing 49.

In the electric driving device 40, the output shaft 41a of the motor 41 and the output shaft 42 of the electric driving device 40 are disposed spaced apart vertically from each other, and a main rotational axis 70 of the electric driving device 40 is positioned on the same axis as the output shaft 41a of the motor 41. A final reduction gear mechanism 43f, configured to decelerate the rotation of the motor 41 between the output shaft 42 of the electric driving device 40 and itself, is provided at a right end portion of the main rotational axis 70, and a first reduction gear mechanism 43a to a third reduction gear mechanism 43c, configured to decelerate the rotation of the motor 41 between the output shaft 41a of the motor 41 and themselves, and the clutch 48 are provided on the main rotational axis 70. The plurality of reduction gear mechanisms 43a to 43f and the clutch 48 are the same as those of the electric driving device 40 of the first example, and hence, the description thereof will be omitted here. The waterproof shell 60 includes a first shell 61 and a second shell 62, which are divided vertically, and the motor housing 49 is surrounded by assembling them together.

[Waterproof Structure]

Next, a waterproof structure for the hinge device 11 and the latch device 12 will be described.

The waterproof shells 60 for surrounding the motor housings 49 in the ways described above are provided for the electric driving devices 40 of the first and second examples, respectively. In each example, water can be prevented from intruding into the electric driving device 40 by surrounding the full circumference of the motor housing 49 by the waterproof shell 60. In addition, a communication hole 63 is provided in the waterproof shell 60 for the grommet 45 provided on the motor housing 49 to pass therethrough, and the electric power supply line 44 of the motor 41 extends to the exterior of the waterproof shell 60 by passing through the grommet 45 which extends to the exterior from the communication hole 63 in the waterproof shell 60. As a result, the intrusion of water into the interior of the motor housing 49 can be suppressed further.

In the latch device 12 of the present embodiment, as shown in FIGS. 6 and 7, the interior of the housing 250 is sealed from the space defined between the base plate 260 and the back plate 270. That is, although the main shaft 310 and the pawl shaft 320 penetrate through the right side portion 250a of the housing 250, even in the event that water intrudes from the striker receiving groove 261 into the space defined between the base plate main body 262 and the back plate 270, the water is prevented from intruding into the second accommodation space 256 of the housing 250 by the waterproof structure of the latch device 12.

To make this happen, a first seal member SE1 is provided between the main shaft 310 which supports the claw 210 and the ratchet 230 and the right side portion 250a of the housing 250 (the right side portion of the body 253), and a second seal member SE2 is provided between the pawl shaft 320 which supports the pawl 220 and the right side portion 250a of the housing 250 (the right side portion of the body 253).

The first seal member SE1 is provided in a first shaft support portion 250b formed on the right side portion 250a of the housing 250. The first shaft support portion 250b includes a body cylindrical portion 21 projecting into an annular shape in a direction moving away from the back plate 270 and a body annular portion 22 extending radially inwards from a distal end portion of the body cylindrical portion 21 in such a manner as to surround the main shaft 310 circumferentially, which are provided on the right side portion 250a which is in abutment with the back plate 270. The first seal member SE1 is accommodated in a space defined by the body cylindrical portion 21 and the body annular portion 22 and is disposed around the main shaft 310 which penetrates through the body annular portion 22. The first seal member SE1 has an X-shaped cross section and seals up a space defined between the right side portion 250a of the housing 250 and the main shaft 310.

As a result, since the first seal member SE1 is provided between the main shaft 310 which supports the claw 210 and the ratchet 230 and the right side portion 250a of the housing 250, even in the event that water intrudes into the inside of the base plate 260, the water is prevented from intruding further into the interior of the housing 250.

Additionally, a third seal member SE3 is provided in such a manner as to be disposed around the main shaft 310 so as to seal up a space between the back plate 270 and the main shaft 310. To describe this more specifically, the back plate 270 includes a protruding portion 271 which protrudes in a direction in which it moves away from the right side portion 250a of the housing 250 so as to define a space between the right side portion 250a of the housing 250 and itself. A predetermined gap is provided between a distal end portion of the protruding portion 271 and the main shaft 310.

The third seal member SE3 includes a seal cylindrical portion 35 passing through this gap to extend along the main shaft 310 and a seal flange portion 36 extending from the seal cylindrical portion 35 radially outwards towards the space defined between the right side portion 250a of the housing 250 and the protruding portion 271. The seal flange portion 36 of the third seal member SE3 is held between the right side portion 250a of the housing 250 and the protruding portion 271, and the seal cylindrical portion 35 of the third seal member SE3 is held between a flange portion 314 of the main shaft 310 which is formed on a side of the protruding portion 271 of the back plate 270 which faces the claw 210 and the first seal member SE1.

As a result, the space defined between the main shaft 310 and the back plate 270 is sealed up by the third seal member SE3. Thus, since the first seal member SE1 and the third seal member SE3 are provided between the main shaft 310 and the right side portion 250a of the housing 250 and the back plate 270, the waterproof function between the main shaft 310 and the right side portion 250a of the housing 250 can be improved further.

The second seal member SE2 is provided at the second shaft support portion 250c formed on the right side portion 250a of the housing 250. The second shaft support portion 250c includes a body cylindrical portion 25 projecting into an annular shape in a direction moving away from the back plate 270 and a body annular portion 26 extending radially inwards from a distal end portion of the body cylindrical portion 25 in such a manner as to surround the pawl shaft 320 circumferentially, which are provided on the right side portion 250a which is in abutment with the back plate 270. The second seal member SE2 is accommodated in a space defined by the body cylindrical portion 25 and the body annular portion 26 and is disposed around the pawl shaft 320 which penetrates through the body annular portion 26. The second seal member SE2 has an X-shaped cross section and seals up a space defined between the right side portion 250a of the housing 250 and the pawl shaft 320.

As a result, since the second seal member SE2 is provided between the pawl shaft 320 which supports the pawl and the right side portion 250a of the housing 250, even in the event that water intrudes into the inside of the back plate 260, the water is prevented from intruding further into the interior of the housing 250. Since the pawl shaft 320 is a fixed shaft, the waterproof structure of the pawl shaft 320 is made simpler than the waterproof structure of the main shaft 310, which is a rotational shaft.

Thus, although the main shaft 310 and the pawl shaft 320 penetrate through the right side portion 250a of the housing 250, water is prevented from intruding into the second accommodation space 256 of the housing 250 by the waterproof structure of the latch device 12. In order to strengthen the waterproof function of the housing 250, a waterproof structure may be provided individually between the case 251 and the cover 252 and between the case 251 and the body 253. The waterproof structure adopts, for example, an O ring having a circular or elliptic cross section or an X ring having an X-shaped cross section. As a result, providing the waterproof structure individually between the case 251 and the cover 252 and between the case 251 and the body 253 can prevent the intrusion of water into the interior of the housing 250 in a more ensured fashion.

Thus, although the embodiment of the present invention has been described heretofore by reference to the drawings, needless to say, the present invention is not limited to the embodiment at all. It is obvious that those skilled in the art to which the present invention pertains will arrive at various altered examples or modified examples without departing from the spirit and scope of the present invention, and it is natural to understand that those altered or modified examples will fall within the technical scope of the present invention. Additionally, the constituent elements described in the embodiment may be combined together arbitrarily without departing from the spirit and scope of the present invention.

For example, while of the left and right hinge portions 4, only the right hinge portion 4 is described as configuring the hinge device 11 installing the electric driving device 40, only the left hinge portion 4 may configure the hinge device 11, or both the hinge portions 4 may configure the hinge device 11.

The present description describes at least the following matters. The corresponding constituent elements described in the embodiment are parenthesized, but the present invention is not limited to those parenthesized constituent elements.

(1) An opening/closing mechanism for an opening/closing member, including:
  a hinge device (the hinge device 11) configured to rotate the opening/closing member (the tail gate 10) relative to a vehicle body (the side walls 3); and
  a latch device (the latch device 12) configured to be brought into engagement with a striker (the striker 5) provided on the vehicle body to thereby hold the opening/closing member in a closed state,
  wherein the hinge device includes:
  an electric driving device (the electric driving device 40) provided on the opening/closing member and configured to rotate the opening/closing member by means of a driving force of a motor (the motor 41); and
  a coupling (the coupling 50) configured to couple a body-side engagement portion (the body-side engagement portion 8) provided on the vehicle body and an output shaft (the output shaft 42) of the electric driving device together, and
  wherein the coupling includes:
  a first cylindrical portion (the first cylindrical portion 52) provided at one end side (the left end side) and having a fitting hole portion (the fitting hole portion 51), to which the output shaft of the electric driving device is spline fit;

a second cylindrical portion (the second cylindrical portion 54) provided at the other end side (the right end side) and having a fitting recessed portion (the fitting recessed portion 53) configured to fit on the body-side engagement portion; and a coupling portion (the coupling portion 55) where the first cylindrical portion and the second cylindrical portion are coupled together.

According to (1), since the output shaft of the electric driving device fits in the fitting hole portion in the first cylindrical portion formed at the one end side of the coupling, and the body-side engagement portion fits in the fitting recessed portion in the second cylindrical portion formed at the other end side of the coupling, the driving force of the motor can be transmitted to the body-side engagement portion as required via the coupling. In addition, the number of components involved can be reduced in comparison with the conventional case in which the torque bar is fitted in the coupling, thereby making it possible to suppress the enlargement in size of the hinge device.

(2) The opening/closing mechanism for the opening/closing member according to (1), wherein the electric driving device includes:

a plurality of reduction gear mechanisms (the reduction gear mechanisms 43a to 43f); and a clutch (the clutch 48) disposed between an output shaft (the output shaft 41a) of the motor and a final reduction gear mechanism (the final reduction gear mechanism 43f) and configured to cut off a transmission of power between the output shaft of the motor and the output shaft of the electric driving device, and wherein the opening/closing mechanism for the opening/closing member is configured to:

control the clutch to be put in a disengaged state in a case the opening/closing member is manually opened or closed; and control the clutch to be put in an engaged state in a case the opening/closing member is opened or closed by means of the driving force of the motor.

According to (2), when the user manually opens or closes the opening/closing member, a risk of the motor being entrained can be avoided by causing the clutch to be put in the disengaged state. In addition, a risk of excessive torque being inputted into the clutch can be avoided by disposing the clutch between the output shaft of the motor and the final reduction gear mechanism.

(3) The opening/closing mechanism for the opening/closing member according to (2), wherein the electric driving device includes:

a motor housing (the motor housing 49) configured to accommodate the motor, the plurality of reduction gear mechanisms, and the clutch; and a waterproof shell (the waterproof shell 60) surrounding the motor housing.

According to (3), the intrusion of water into the motor housing can be prevented.

(4) The opening/closing mechanism for the opening/closing member according to (3), wherein an electric power supply line (the electric power supply line 44) of the motor passes through a grommet (the grommet 45), which extends to an exterior from a communication hole (the communication hole 63) in the waterproof shell, to extend to an exterior of the waterproof shell.

According to (4), although the electric power supply line of the motor needs to be pulled out from the communication hole in the waterproof shell to the exterior, the intrusion of water into the interior of the motor housing can be suppressed further by causing the electric power supply line to pass through the grommet which extends from the communication hole in the waterproof shell to the exterior.

(5) The opening/closing mechanism for the opening/closing member according to (3) or (4), wherein the latch device includes:

a claw (the claw 210) configured to be brought into engagement with the striker to rotate;

a ratchet (the ratchet 230) configured to rotate together with the claw and to hold the opening/closing member in a half open state and the closed state by being engaged with a pawl (the pawl 220);

a first shaft (the main shaft 310) configured to support the claw and the ratchet;

a second shaft (the pawl shaft 320) configured to support the pawl;

a latch motor (the motor 6);

a driving force transmission mechanism (the driving force transmission mechanism 200) configured to switch the opening/closing member between the half open state and the closed state using a driving force of the latch motor;

a housing (the housing 250) configured to accommodate the pawl, the ratchet, the latch motor, and the driving force transmission mechanism; and a base plate (the base plate 260) configured to accommodate the claw between one side portion (the right side portion 250a) of the housing and itself, wherein the first shaft is supported in the base plate at one end portion (the right end portion 311) and is supported in the one side portion of the housing at an intermediate portion (the intermediate portion 312) positioned between the claw and the ratchet, wherein the second shaft is supported in the one side portion of the housing at a one end portion (the right end portion 322), wherein a first seal member (the first seal member SE1) is provided between the first shaft and the one side portion of the housing, and wherein a second seal member (the second seal member SE2) is provided between the second shaft and the one side portion of the housing.

According to (5), since the first seal member is provided between the first shaft, which supports the claw and the ratchet, and the one side portion of the housing, and the second seal member is provided between the second shaft, which supports the pawl, and the one side portion of the housing, even in the event that water intrudes into the inside of the base plate, the water is prevented from intruding into the interior of the housing. As a result, the waterproof performances of both the latch device and the hinge device can be improved.

REFERENCE SIGNS LIST

3 Side wall (vehicle body)
5 Striker
6 Motor (latch motor)
8 Body-side engagement portion
10 Tail gate (opening/closing member)
11 Hinge device
12 Latch device
40 Electric driving device
41 Motor
41a Output shaft of Motor
42 Output shaft of Electric driving device 43a, 43b, 43c, 43d, 43e, 43f Reduction gear mechanism
43f Final reduction gear mechanism
44 Electric power supply line
45 Grommet
48 Clutch
49 Motor housing
50 Coupling
51 Fitting hole portion
52 First cylindrical portion
53 Fitting recessed portion
54 Second cylindrical portion
55 Coupling portion
60 Waterproof shell
63 Communication hole
200 Driving force transmission mechanism
210 Claw
220 Pawl
230 Ratchet
250a Right side portion
250 Housing
260 Base plate
310 Main shaft (First shaft)
311 Right end portion of Main shaft (right end portion of first shaft)
312 Intermediate portion of Main shaft (intermediate portion of first shaft)
320 Pawl shaft (second shaft)
322 Right end portion of Pawl shaft (right end portion of second shaft)
SE1 First seal member
SE2 Second seal member

The invention claimed is:

1. An opening/closing mechanism for an opening/closing member, comprising:
a hinge device configured to rotate the opening/closing member relative to a vehicle body; and
a latch device configured to be brought into engagement with a striker provided on the vehicle body to hold the opening/closing member in a closed state,
wherein the hinge device comprises:
an electric driving device provided on the opening/closing member and configured to rotate the opening/closing member by means of a driving force of a motor; and
a coupling configured to couple a body-side engagement portion provided on the vehicle body and an output shaft of the electric driving device together, and
wherein the coupling comprises:
a first cylindrical portion provided at a first end side of the coupling and having a fitting hole portion, to which the output shaft of the electric driving device is spline fit;
a second cylindrical portion provided at a second end side of the coupling, which is opposite to the first end side, and having a fitting recessed portion configured to fit on the body-side engagement portion; and
a coupling portion where the first cylindrical portion and the second cylindrical portion are coupled together.

2. The opening/closing mechanism for the opening/closing member according to claim 1,
wherein the electric driving device comprises:
a plurality of reduction gear mechanisms; and
a clutch disposed between an output shaft of the motor and a final reduction gear mechanism and configured to cut off a transmission of power between the output shaft of the motor and the output shaft of the electric driving device, and
wherein the opening/closing mechanism for the opening/closing member is configured to:
control the clutch to be put in a disengaged state in a case the opening/closing member is manually opened or closed; and
control the clutch to be put in an engaged state in a case the opening/closing member is opened or closed by means of the driving force of the motor.

3. The opening/closing mechanism for the opening/closing member according to claim 2,
wherein the electric driving device comprises:
a motor housing configured to accommodate the motor, the plurality of reduction gear mechanisms, and the clutch; and
a waterproof shell surrounding the motor housing.

4. The opening/closing mechanism for the opening/closing member according to claim 3,
wherein an electric power supply line of the motor passes through a grommet, which extends to an exterior from a communication hole in the waterproof shell, to extend to an exterior of the waterproof shell.

5. The opening/closing mechanism for the opening and closing member according to claim 3,
wherein the latch device comprises:
a claw configured to be brought into engagement with the striker to rotate;
a ratchet configured to rotate together with the claw and to hold the opening/closing member in a half open state and the closed state by being engaged with a pawl;
a first shaft configured to support the claw and the ratchet;
a second shaft configured to support the pawl;
a latch motor;
a driving force transmission mechanism configured to switch the opening/closing member between the half open state and the closed state using a driving force of the latch motor;
a housing configured to accommodate the pawl, the ratchet, the latch motor, and the driving force transmission mechanism; and
a base plate configured to accommodate the claw between a first side portion of the housing and the base plate,
wherein the first shaft is supported in the base plate at a first end portion and is supported in the first side portion of the housing at an intermediate portion positioned between the claw and the ratchet,
wherein the second shaft is supported in the first side portion of the housing at a first end portion,
wherein a first seal member is provided between the first shaft and the first side portion of the housing, and
wherein a second seal member is provided between the second shaft and the first side portion of the housing.

* * * * *